(12) United States Patent
Cotter

(10) Patent No.: US 9,339,808 B2
(45) Date of Patent: May 17, 2016

(54) ENHANCEMENT OF SURFACE-ACTIVE SOLID-PHASE HETEROGENEOUS CATALYSTS

(75) Inventor: Mitchell A. Cotter, Releigh, NC (US)

(73) Assignee: CCMI Corporation, Spring Valley, NY (US)

( * ) Notice: Subject to any disclaimer, the term of this patent is extended or adjusted under 35 U.S.C. 154(b) by 500 days.

(21) Appl. No.: 13/219,293

(22) Filed: Aug. 26, 2011

(65) Prior Publication Data

US 2012/0197056 A1  Aug. 2, 2012

Related U.S. Application Data

(63) Continuation of application No. 12/431,551, filed on Apr. 28, 2009, now abandoned, which is a continuation of application No. 11/499,851, filed on Aug. 3, 2006, now abandoned.

(60) Provisional application No. 60/705,656, filed on Aug. 3, 2005.

(51) Int. Cl.
*B01J 8/08* (2006.01)
*B01J 8/22* (2006.01)
(Continued)

(52) U.S. Cl.
CPC .............. *B01J 35/026* (2013.01); *B01J 8/0095* (2013.01); *B01J 8/02* (2013.01); *B01J 8/22* (2013.01); *B01J 8/222* (2013.01); *B01J 8/24* (2013.01); *B01J 10/007* (2013.01); *B01J 12/007* (2013.01);
(Continued)

(58) Field of Classification Search
None
See application file for complete search history.

(56) References Cited

U.S. PATENT DOCUMENTS 2,408,164 A * 9/1946 Foster ........................... 502/226
2,425,398 A * 8/1947 Ruthruff ........................ 549/249
(Continued)

FOREIGN PATENT DOCUMENTS

WO    WO 90/13125 A1    11/1990
WO    WO 9640432 A1  * 12/1996
WO    WO 2007/019390 A2    2/2007

OTHER PUBLICATIONS

Casimir, H.G.B., On the Attraction Between Two Perfectly Conducting Plates. Proc. Kon. Ned. Akad. van Weten. 1948, vol. 51, No. 7, pp. 793-795.
(Continued)

*Primary Examiner* — Jennifer A Leung
(74) *Attorney, Agent, or Firm* — Wolf, Greenfield & Sacks, P.C.

(57) ABSTRACT

Surface-active solid-phase catalyst activity may be substantially improved by creating deliberate repetitive surface-to-surface contact between portions of the active surfaces of catalyst objects. While they are immersed in reactant material such contact between portions of the active surfaces of catalyst objects can substantially activate the surfaces of many heterogeneous catalysts. Examples are given of such action employing a multitude of predetermined shapes, supported catalyst structures, etc. agitated or otherwise brought into contact to produce numerous surface collisions. One embodiment employs a gear pump mechanism with catalytically active-surfaced gear teeth to create the repetitive transient contacting action during pumping of a flow of reactant. The invention is applicable to many other forms for creating transient catalytic surface contacting action. Optionally catalytic output of such systems may be significantly further improved by employing radiant energy or vibration.

25 Claims, 29 Drawing Sheets

(51) Int. Cl.
    *B01J 35/02*     (2006.01)
    *B01J 8/00*     (2006.01)
    *B01J 8/02*     (2006.01)
    *B01J 8/24*     (2006.01)
    *B01J 10/00*     (2006.01)
    *B01J 12/00*     (2006.01)
    *B01J 14/00*     (2006.01)
    *B01J 15/00*     (2006.01)
    *B01J 16/00*     (2006.01)
    *B01J 19/18*     (2006.01)
    *B01J 19/20*     (2006.01)
    *B01J 19/26*     (2006.01)
    *B01J 19/30*     (2006.01)
    *B01J 23/44*     (2006.01)
    *B01J 37/02*     (2006.01)
    *F04C 13/00*     (2006.01)
    *F04C 2/08*     (2006.01)
    *F04C 2/10*     (2006.01)
    *F04C 2/18*     (2006.01)

(52) U.S. Cl.
    CPC .............. *B01J 14/005* (2013.01); *B01J 15/005* (2013.01); *B01J 16/005* (2013.01); *B01J 19/18* (2013.01); *B01J 19/1812* (2013.01); *B01J 19/20* (2013.01); *B01J 19/26* (2013.01); *B01J 19/30* (2013.01); *B01J 23/44* (2013.01); *B01J 35/023* (2013.01); *B01J 37/0225* (2013.01); *F04C 13/00* (2013.01); *B01J 2208/00672* (2013.01); *B01J 2219/30234* (2013.01); *B01J 2219/30246* (2013.01); *B01J 2219/30296* (2013.01); *B01J 2219/30408* (2013.01); *B01J 2219/30416* (2013.01); *B01J 2219/30475* (2013.01); *F04C 2/084* (2013.01); *F04C 2/10* (2013.01); *F04C 2/18* (2013.01); *Y10T 428/16* (2015.01)

(56) References Cited

U.S. PATENT DOCUMENTS

| | | | |
|---|---|---|---|
| 2,812,406 A | 11/1957 | Egan | |
| 2,987,465 A * | 6/1961 | Johnanson | 208/408 |
| 3,684,741 A * | 8/1972 | Friedrichsen et al. | 502/209 |
| 3,966,644 A | 6/1976 | Gustafson | |
| 4,293,445 A | 10/1981 | Shimizu et al. | |
| 4,370,492 A | 1/1983 | Wunder et al. | |
| 4,402,870 A | 9/1983 | Schurmans | |
| 4,467,080 A * | 8/1984 | Brun et al. | 526/62 |
| 4,495,307 A | 1/1985 | Clements | |
| 4,573,030 A | 2/1986 | Schubert | |
| 4,576,926 A | 3/1986 | Wang et al. | |
| 4,701,436 A | 10/1987 | Wang et al. | |
| 4,804,796 A | 2/1989 | Wang et al. | |
| 4,902,407 A * | 2/1990 | Chan et al. | 208/152 |
| 5,124,291 A | 6/1992 | Bremer et al. | |
| 5,212,132 A * | 5/1993 | Spitz et al. | 502/134 |
| 5,237,019 A | 8/1993 | Wieland et al. | |
| 5,660,531 A | 8/1997 | Merkle et al. | |
| 6,518,220 B2 | 2/2003 | Walsdorff et al. | |
| 6,518,684 B1 | 2/2003 | Schaich et al. | |
| 6,747,180 B2 | 6/2004 | Ostgard et al. | |
| 6,821,922 B1 | 11/2004 | Tacke et al. | |
| 6,831,037 B2 | 12/2004 | Szymanski et al. | |
| 6,852,669 B2 | 2/2005 | Voit et al. | |
| 6,867,166 B2 | 3/2005 | Yang et al. | |
| 2002/0045540 A1* | 4/2002 | Bartholdy | 502/222 |
| 2002/0106320 A1* | 8/2002 | Zhou | B01J 21/18 423/584 |
| 2005/0014636 A1* | 1/2005 | Zhou et al. | 502/159 |
| 2005/0130837 A1 | 6/2005 | Hoek et al. | |
| 2005/0281682 A1 | 12/2005 | Paxton et al. | |
| 2006/0115389 A1* | 6/2006 | Indech | 422/168 |

OTHER PUBLICATIONS

Hermance et al., Organic Deposits on Precious Metal Contacts. The Bell System Technical Journal. May 1958, pp. 739-776.

Piotter et al., Micro Powder-Injection Moulding of Metals and Ceramics. Sadhana. vol. 28, Parts 1 & 2, Feb./Apr. 2003, pp. 299-306.

International Search Report for PCT/US2006/030612 received Jan. 29, 2007.

Written Opinion for PCT/US2006/030612 received Jan. 29, 2007.

International Preliminary Report on Patentability for PCT/US2006/030612 received Nov. 27, 2007.

* cited by examiner

… … …

ENHANCEMENT OF SURFACE-ACTIVE SOLID-PHASE HETEROGENEOUS CATALYSTS

CROSS-REFERENCE TO RELATED APPLICATIONS

This application is a continuation of U.S. application Ser. No. 12/431,551, entitled ENHANCEMENT OF SURFACE-ACTIVE SOLID-PHASE HETEROGENEOUS CATALYSTS, filed on Apr. 28, 2009, which is a continuation of U.S. application Ser. No. 11/499,851 filed on Aug. 3, 2006, which claims priority under 35 U.S.C. §119(e) to U.S. Provisional Application Ser. No. 60/705,656, filed Aug. 3, 2005. The contents of each of the above-mentioned applications are incorporated herein by reference in their entireties.

FIELD OF THE INVENTION

The present disclosure describes heterogeneous catalysts and catalyst reactor systems and related methods, which employ surface-active solid-phase catalyst materials acting on reactant matter.

BACKGROUND OF THE INVENTION

Catalyst materials promote chemical reactions but do not themselves enter into the output product nor are they consumed by the reaction. "Heterogeneous catalysis" refers to a catalytic process in which the physical states of the catalyst and reactant (material involved in the chemical reaction) are different. This is distinguished from "homogeneous catalysis", where the reactant and the catalyst have the same physical state and, as a result form solutions or miscible mixtures (liquid/liquid; gas/gas). For example, the physical state of heterogeneous catalyst material may typically be solid-phase (e.g., a metal or ceramic) while the reactants may be gases and/or liquids. Therefore, the "surfaces" of a solid catalyst material that may contact a reactant play a significant role in catalysis.

However, with advancing knowledge of the nature of "states of matter" many conventional theoretical models of solid, liquid or gas may be poorly suited to describe the range of states of matter. A "surface" displays far more complexity than an oversimplified image of a visual plane used in many conventional models to describe it. The theoretical model of a sharp boundary as characteristic of a surface may be misleading for understanding certain catalytic surface activity. Instead, a surface of a solid may be viewed as a zone or transition region where close spaced atomic groups inside the solid taper off as the view looks toward the edge of the surface zone. Inside, the solid components are closely bound but at the surface such bonding is disturbed.

For more than a century, countless specific examples of catalysts have been cataloged, developed and applied. The many known reactions presently form the foundation of most of the world's chemical industry. Recognition of catalytic effects began at the dawn of the $19^{th}$ century. In the early $20^{th}$ century, many large industrial scale reactions began utilizing important industrial processes using heterogeneous catalysts. Notable examples are the Haber-Bosch ammonia synthesis (fertilizers for world agriculture), the Fischer-Tropsch hydrocarbon synthesis (oil, gasoline and hydrocarbon materials), and the synthesis of plastic materials, resulting in a vast polymer chemical industry. Catalytic processes in the chemical industries of the world currently have enormous commercial significance. A large fraction of all chemical production is catalyst based. Some approaches to fundamental theories of catalysis exist, such as the Density Functional Theory, which involves mathematical approximation of some quantum-mechanical factors representing chemical bonding. Nevertheless, development of products and processes remain largely based on pragmatic experimental approaches. Consequently, the field of heterogeneous catalysis is replete with "recipes" for producing various kinds of catalysts utilizing a wide variety of materials and constructions. In fact, catalysts are often known by the molecular species of their reactions rather than by their mode of action or even by their construction. Three typical examples of recent US Patents involving catalysts are: U.S. Pat. No. 6,821,922 to Tacke et al "Supported Catalyst For The Production Of Vinyl Acetate Monomer"; U.S. Pat. No. 6,852,669 to Voit et al "Hydrogenation Catalyst"; and U.S. Pat. No. 6,867,166 to Yang et al "Selective Adsorption Of Alkenes Using Supported Metal Compounds". A product descriptive brochure from the Johnson Matthey Company, a major supplier of catalyst materials, is similarly functionally descriptive for each of a group of Palladium based products the company offers for carbon-carbon bonding. (See brochure available on the Internet at www.amcpmc.com/pdfs/producttype/45.pdf). In short, the chemist's understanding of the foundational fundamentals of catalyst art progresses but as yet is incomplete.

Heterogeneous catalysts having a spherical particle shape have often been employed as catalysts and catalyst substrates. Such interest has typically been in pursuit of large apparent surface area for contact with reactant, with some added concern for thermal properties such as heat transfer in exothermic reactions. For example, U.S. Pat. No. 6,747,180 to Ostgard et al, "Metal Catalyst" describes the forming of hollow metallic spheres of 0.5 mm to 20 mm diameter. Its focus appears to be reduction of the amount of expensive metal unavailable in the sphere's interior to the catalytic surface of the desired spherically shaped particles.

U.S. Pat. No. 5,237,019 to Weiland et al, describes small spherical particles of from 0.01 to 3.0 mm diameter composed of organosiloxane materials containing platinum group metals. The particles are specified to have a bulk density below that of water while allowing a wide range of surface area to be obtained from varied particle size. Obtaining large surface area this way appears a major objective. Emphasis is also placed on the character of the catalyst metal dispersed in of such compositions.

U.S. Pat. No. 6,518,220 to Walsdorff et al, describes "Shaped Catalysts" of a hollow cylindrical or annular form of a catalytically active material. Improved selectivity of the preferred shape as well as reduced pressure drop are the disclosed objectives of the design.

In several U.S. Patents to Wang et al (U.S. Pat. Nos. 4,804, 796, 4,701,436 and 4,576,926), hollow spheres are disclosed that are formed in various ways to enable the effective density of such spheres to be made to allow such to float in a medium of choice. An object of these patents is to improve the dispersion of such catalyst in the selected reactant medium.

U.S. Pat. No. 3,966,644 to Gustafson, titled "Shaped Catalyst Particles" describes a longitudinally symmetric trilobe shaped alumina composite catalyst particle having a narrow range of sizes and specific porosity characteristics claimed useful for hydrocarbon conversions of petroleum residuum. The shape is discussed in terms of its void ratio and flow properties, improved activity, claimed longer duration of effective operating time and, superior crush resistance.

U.S. Patent Application US 2005/0130837 by Hoek et al, titled "Shaped Catalyst Particles For Hydrocarbon Synthesis" describes a trilobular extruded shaped catalyst form, having a void ratio in excess of 50%, well in excess of the 43% or so of other trilobal designs. Flow rates appear to be a principal concern of these applicants.

U.S. Pat. No. 4,293,445 to Shimizu et al "Method For Production of Molded Product Containing Titanium Oxide" discloses the addition a small proportion of barium for improving the strength of the ceramic catalyst product.

A focus of conventional improvements in the catalyst art has been to maximize the surface area of catalyst material exposed to the reactant. This has been accomplished via various means: in one way through creation of powdery and porous materials; in another through high surface area geometries; in another through the use of chemical processes acting on the catalyst's surface to "activate" or "refresh" it.

Certain investigators outside the field of chemistry and catalysis have observed what they believed to be detrimental effects of surface-surface contact in the context of electrical switches and relays. Such phenomena were studied in a series of papers coming from The Bell Laboratories in the early 1950s (See, The Bell System Technical Journal, May 1958 pp 738-776, "Organic Deposits on Precious Metal Contacts" By H. W. Hermance & T. F. Egan). The Bell Labs workers' motivation for the study came from examining the intermittent failure of telephone exchange switching relays caused by accumulation of organic deposits formed on their contacts.

Surprisingly this problem was exacerbated when efforts were made to hermetically seal a very large number of switching relays employed in a telephone exchange of that era. The sealing effort initially seemed desirable to protect the contacts from dust and airborne contaminants. However, small amounts of organic vapor inside the sealed relays (coming from magnet wire, insulation, and other organic material of their fabrication) were not eliminated and deposited on the contacts sealed inside. The resulting problems were severe because the "open" circuit caused by a deposit would soon disappear, making it difficult to locate. The Bell researchers devised non-current carrying relay-contact-operating mechanisms to evaluate various kinds of contact material and environments. The signal circuits that appeared most vulnerable carried essentially no current through the relay contacts and operated only with very small signal voltages. Such "dry circuit" operation could provide no arcing actions that might clean contacts. The Bell Labs researchers discovered that the carefully chosen corrosion resistant group 10 (platinum group) contact metals were very prone to forming the disturbing organic deposits they named "contact polymers."

While much effort has been directed to increasing catalysts' effective surface area as determined by gas adsorption tests, the resulting increase in surface complexity and porosity has also led to detrimental reactant trapping and retarded movement of reaction materials. Accordingly, improved heterogeneous catalysts, catalyst systems and catalytic reaction methods are still needed.

SUMMARY OF THE INVENTION

The present invention involves, in certain embodiments, utilization of repeated catalyst-to-catalyst surface contact to excite catalytic activity of the contacting surfaces. Previous research has shown such contacting can produce surface defects and rearrangement of constituent atoms on contacting surfaces. The applicability and utility of this phenomena appears to be previously unrecognized and unapplied in the field of catalysis. As discussed below, such surface-to-surface contact may be utilized to enhance catalytic activity.

The present invention provides catalytic reactor systems comprising at least two catalytic objects each object having at least one surface complementary in shape and/or contour to at least one surface on another of the catalytic objects such that a projected contact area between two of the catalytic objects is capable of being greater than 1% of a total catalytically active external contact surface area of the two contacting catalytic objects, and a contact-inducing device configured and arranged to repeatedly bring complementary surfaces of the at least two catalytic objects into contact with each other such that the a projected contact area between two of the contacting catalytic objects is on average greater than 1% of the catalytically active total external contact surface area of the two contacting catalytic objects.

In one embodiment, the catalytic reactor system comprises at least two catalytic objects each object having at least one surface complementary in shape and/or contour to at least one surface on each other of the catalytic objects such that a projected contact area between any two of the catalytic objects is capable of being greater than 1% of a catalytically active total external contact surface area of the two contacting catalytic objects. In another embodiment, each of the two catalytic objects comprises at least one essentially planar surface such that an essentially planar surface of a first catalytic object is capable of contacting an essentially planar surface of a second catalytic object.

Catalytic objects of the present invention may comprise a catalytically active material comprising a metal or metal alloy. Catalytic objects of the present invention may further comprise a support material coated with a catalytically active material. In one embodiment, the support material is a ceramic. In another embodiment, the at least two catalytic objects comprise discrete particles or pellets. In another embodiment, the catalytic objects are essentially non-porous.

In one embodiment, the catalytic reactor system comprises an industrial scale slurry bubble column reactor and the contact-inducing device comprises a device configured to generate fluid flow capable of suspending and/or agitating the discrete particles or pellets. In one embodiment, the catalyst reactor system comprises an industrial scale continuously stirred tank reactor wherein the contact-inducing device comprises a stirring device. In some embodiments, the contact-inducing device comprises a mechanical apparatus comprising or to which is attached at least one of the catalytic objects.

In one embodiment, the catalyst objects are discrete particles or pellets having a shape that is essentially a truncated icosahedron. In another embodiment, at least one of the catalytic objects has a shape that is essentially a cylinder. In another embodiment, a cross-section of the cylinder perpendicular to its longitudinal axis has a perimeter that is polygonal. In another embodiment, at least one of the catalytic objects is configured as a gear having a plurality of gear teeth.

In certain embodiments, the catalyst reactor system further comprises a reactor comprising an inlet configured to allow a reactant to flow into the reactor and an outlet configured to allow a product to flow out of the reactor, wherein the catalytic objects are contained within the reactor such that the catalytic objects are exposed to the reactant.

Another aspect of the present invention provides a method for performing a reaction catalyzed by a heterogeneous catalyst, comprising acts of: exposing at least two objects each object having at least one surface complementary in shape and/or contour to at least one surface on another of the objects, at least one of which objects is a catalytic object having a surface that is catalytically active, to an environment comprising a selected reactant; creating repeated contact between the objects such that a projected contact area between complementary surfaces of two contacting objects is on average greater than 1% of a catalytically active total external contact surface area of the two contacting objects; and allowing the predetermined reactant to undergo a chemical reaction at the at least one catalytically active surface to produced a desired product.

In one embodiment, each of the objects is a catalytic object having a surface that is catalytically active. In another embodiment, each of the catalytic objects comprises at least one essentially planar surface having an area comprising at least about 1% of the catalytically active external surface area of the object.

In some embodiments, the catalyst objects are immersed in the environment. In one embodiment, the environment is a solution comprising the predetermined reactant. In another embodiment, the environment is a gas comprising the predetermined reactant.

In some embodiments, the contact is recurring and transient. In some embodiments, the contact causes at least a portion of an external catalytically active surface area of the catalytic object to become regenerated.

The present invention also relates to catalytic objects comprising an external surface comprising a plurality of mosaic patches/facets wherein at least one mosaic patch/facet meets an adjacent facet at an edge to form a predetermined three-dimensional shape, wherein at least one mosaic patch/facet comprises a catalytically active material.

In one embodiment, an individual mosaic patch/facet has a surface area greater than 1% of the total external surface area of the catalytic object. In another embodiment, each mosaic patch/facet comprises a catalytically active material. In some embodiments, at least one mosaic patch/facet is essentially planar. In some embodiments, each mosaic patch/facet is essentially planar.

In one embodiment, the catalytically active material comprises a metal or metal alloy.

In one embodiment, the predetermined three-dimensional shape is essentially a truncated icosahedron. In another embodiment, the predetermined three-dimensional shape is essentially a cylinder. In another embodiment, the predetermined three-dimensional shape is essentially in the form of gear teeth on a gear.

In some embodiments, the edge where two adjacent mosaic patches/facets meet is rounded.

Some embodiments of the catalyst object further comprise a support material coated with the catalytically active material. In one embodiment, the support material is a ceramic.

The present invention also relates to catalytic reactor systems comprising a mechanical apparatus constructed and arranged to intermittently create contact between a catalytically active surface of a catalyst object and a contact surface of a second object, such that a projected contact area on average between the two objects is greater than 1% of the total external contact surface area of the two contacting objects. In one embodiment, the contact surface of the second object is a catalytically active surface. In some embodiments, the mechanical apparatus comprises a motor. In some embodiments, the mechanical apparatus comprises a gear pump device. In some embodiments, the mechanical mechanism comprises a series of gear pump devices.

The present invention also provides methods for producing catalytic action upon at least one reactant material, comprising: providing at least two catalytic objects, wherein the catalyst objects each comprise a catalytically active material on at least a portion of an external surface; exposing the catalytic objects to an environment comprising the reactant material; producing motion of the catalyst objects sufficient to cause repeated frequent transient surface to surface impacting contact events between external surface areas of the catalyst objects using a contact-inducing device, the contact events each having on average a projected contact area larger than 1% of the average total projected contact surface area of the catalyst objects coming into contact during the contact event; and transforming at least some reactant material into a desired product chemically different from the reactant material.

In one embodiment, the repeated frequent transient surface to surface impacting contact events progressively occur such that essentially all the catalytically active external surface of the catalyst objects comes into contact during the method. In another embodiment, the motion averages distribution of the contact events over essentially all the catalytically active exterior surfaces of all the objects.

In one embodiment, the motion averages distribution of the contact events over a majority of the catalytically active exterior surfaces of the objects. In another embodiment, the motion averages distribution of the contact events over limited portions of the external surfaces of the objects comprising the catalytically active surfaces.

In one embodiment, the catalytically active external surface of at least a portion of at least one catalyst object is segregated into mosaic patches/facets, each mosaic patch/facet having an exterior surface area that is substantially less than the total catalytically active external surface area of the at least one catalyst object. In one embodiment, a first mosaic patch/facet of the catalyst object which is segregated into mosaic patches/facets has a composition of surface material different from a second mosaic patch/facet on the same catalyst object. In another embodiment, a first mosaic patch/facet of a first catalyst object which is segregated into mosaic patches/facets has composition of surface material different from a second mosaic patch/facet on a second catalyst object which is segregated into mosaic patches/facets.

In one embodiment, the aspect ratio of at least one catalytic object is less than about 1.05. In another embodiment, the aspect ratios of each of the catalytic objects is between about 1.25 and about 1.05. In another embodiment, the aspect ratio of at least one of the catalytic object is between 1.25 and 2.00. In another embodiment, the aspect ratio of at least one of the catalytic objects is between about 2.00 and about 3.00. In another embodiment, the aspect ratio of at least one of the catalytic object is greater than about 3.00.

In one embodiment, all the catalytic objects have essentially the same shape and size.

In one embodiment, all the catalytic objects have essentially the same shape but differ by more than 5% from at least one other catalytic object in size.

In certain embodiments, the external surface of the catalytic objects comprise mosaic patches/facets, and wherein at least a first and a second catalytic objects have different polyhedral shapes from each other. In a particular embodiment, the first catalytic object differs by more than about 5% in size from the second catalytic object.

In some embodiments, the external surface of the first catalytic object comprises a first number of mosaic patches/facets while the external surface of the second catalytic object comprises a second number of facets. In a particular embodiment, the first catalytic object differs by more than about 5% in size from the second catalytic object.

In one embodiment, a shape of the catalytic objects is substantially the same as a truncated icosahedron having rounded edges joining adjacent essentially planar mosaic patches/facets, wherein the width of a rounded edge, defining a minimum distance separating adjacent essentially planar mosaic patches/facets, does not exceed about 2% of the nominal overall diameter of the truncated icosahedron.

In one embodiment, the sizes of corresponding dimensions of any two catalyst objects are within 5% of each other.

BRIEF DESCRIPTION OF THE DRAWINGS

The accompanying drawings are schematic and are not intended to be drawn to scale. In the figures, each identical, or substantially similar component that is illustrated in various figures is typically represented by a single numeral or notation. For purposes of clarity, not every component is labeled in every figure, nor is every component of each embodiment of the invention shown where illustration is not necessary to allow those of ordinary skill in the art to understand the invention. In the drawings:

as shown in FIG. 2 or FIG. 3);

FIGS. 17A-C show a PIN link air-bearing assembly the anvil/striker catalytic reactor test apparatus of FIG. 13 of;

DETAILED DESCRIPTION

Definitions

Figure 1:
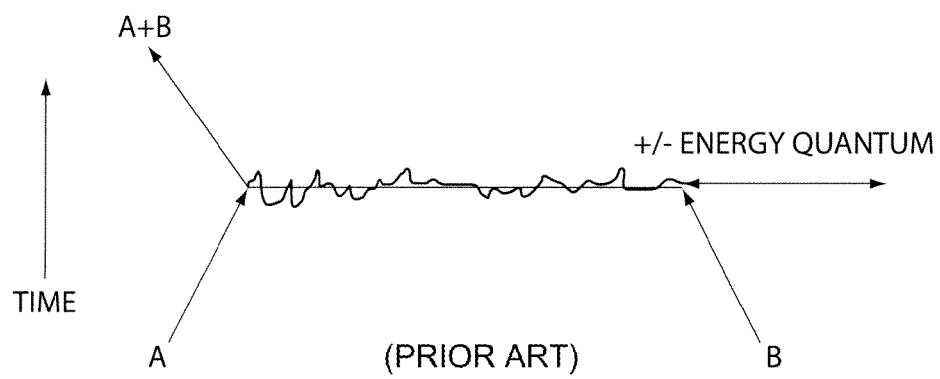
FIG. 1 (prior art) is a plot representing the change of state occurring when two components A and B link chemically with some possible changes in energy occurring.

As used herein, "contact" in the context of catalytic objects or other solid phase surfaces refers to an intimate meeting, on an atomic basis, of at least some surface material substance of each of two, generally solid-phase, different meeting bodies. Such contact may transfer material between the meeting bodies and/or at least reposition some material on one or both bodies.

This disclosure brings new specific meaning to the word "contact." Typically, the term "contact" in the catalyst arts generally is used only in the context of bringing some reactant together with some solid (often a catalyst) upon which some reaction follows.

The present invention introduces a broad range of inventive embodiments of a potent, fundamental surface-active catalyst enhancement involving defined and very specific kinds of contact.

"Solid-phase" refers to matter in the solid-state, i.e., in solid association substantially maintaining its inter-atomic configuration; neither liquid nor gas.

"Catalyst object" or "catalytic object" refers to a discrete physical, substantially solid-phase object having an external surface possessing some catalytic properties when present in some specified environment designated for its use.

"External surface" or "exterior surface" of an object refers to all boundary points between the material substance of a generally solid-phase object and all surrounding points in space that touch the object but do not coincide with any material that remains joined to the object.

"Surface zone" of a generally solid-phase object refers to a region relative to its external surface, influencing the object's catalytic activity, which extends from at least several microns interior to that surface to least several microns exterior to it, understanding that such boundaries are somewhat diffuse.

"Surface-active catalyst" refers to the majority of catalytic action of such a physical catalyst object occurring within or upon a surface zone of such catalyst object.

"Contact event" or "contacting event" refers to the occurrence of an individual contact for at least some finite period of time that may be only of extremely brief duration.

"Separation event" refers to the parting of an existing contact of at least a minimum separation distance of two microns and, for a finite period of time greater than one microsecond.

"Open time" refers to the time elapsed from a separation event to the next occurring contact of either separated contact surface.

"Contact condition" refers to contact occurring in one or many instances during a defined time period.

"Average contact duty cycle" refers to the ratio of average closed time to the average time between recurrences of contact for any defined particular contact condition, or for a defined set of contact events.

"Impacting contact event" refers to the occurrence of a contact event that produces an effect on more than one atom of at least one of the contacting objects either transferring atom(s) between meeting surfaces, or at least two atoms becoming repositioned in at least one catalyst object's surface.

"Projected contact area" refers to the maximum possible area of contact during a contact event, defined as the area included within the coincident boundaries of contact between the two contacting surfaces as if completely merged into one another. Such a projected contact area is therefore typically larger than the actual area of all minute material-to-material physical contact occurring within that area.

"Total external contact surface" refers to the sum of all possible different projected contact areas of a defined pair of contacting objects, such as surface-active catalyst objects, or of a defined set of such objects.

"TICO" is an aphorism for a catalyst substrate form that has a shape modified slightly from a classical truncated icosahedron.

The present invention relates in certain aspects to catalyst reactor systems configured for creating contact between surfaces, for example catalytically active surfaces, of catalyst objects (e.g., solid-phase heterogeneous catalysts) and methods for fabrication and use of such catalysts and catalyst reactor systems. The present invention may comprise recurring transient catalyst surface interactions. The present invention also relates, in certain embodiments, to new geometries for catalysts, e.g. particulate and/or pelleted catalysts (e.g. as illustrated in FIGS. 2-6 and 8-10), and to novel movement and deployment of catalytically active surfaces to optimize the amount and frequency of surface-to-surface contacting action. In some cases, a substantial majority of the active surface area of the catalyst objects may be employed. Catalysts and catalytic methods of the present invention may increase catalytic productivity and may also increase the transport of the heterogeneous reacting materials, e.g. gases, liquids, slurries, and/or supercritical fluids, through the catalyst surface zones, relative to other known catalysts and catalytic methods.

In one embodiment, the present invention relates to catalytic reactor systems comprising at least two catalytic objects having complementary surfaces such that a projected contact area between the two catalytic objects is on average greater than 1%, 2%, 3%, 4%, 5%, 6%, 7%, 8%, 9%, 10% or more of the catalytically active total contact surface area of the catalytic objects, and a contact-inducing device configured and arranged to bring the at least two catalytic objects into contact with each other. As used herein, "complementary surfaces" may refer to the surfaces of any two objects (e.g., catalytic objects), or portions thereof, having a shape, surface topography, and other characteristics that allow a projected contact area defining intimate contact between the two surfaces to be substantially coextensive with the entirety of the external areas of the surfaces or portions. Examples of complementary surfaces include two essentially planar surfaces; an essentially conical projection and an essentially conical indent (for same-sized cones); an essentially hemispherical bump and an essentially hemispherical indent (for same-sized hemispheres); etc. In one embodiment, a catalyst reactor system of the present invention comprises catalytic objects each comprising at least one essentially planar surface such that the essentially planar surface of a first catalytic object is capable of contacting an essentially planar surface of a second catalytic object. The catalytic object may comprise a catalytically active material over at least a portion or over essentially the entirety of its external surface. In certain embodiments, the catalytic object may comprise a support material at least partially coated by a catalytically active material.

Figure 7:
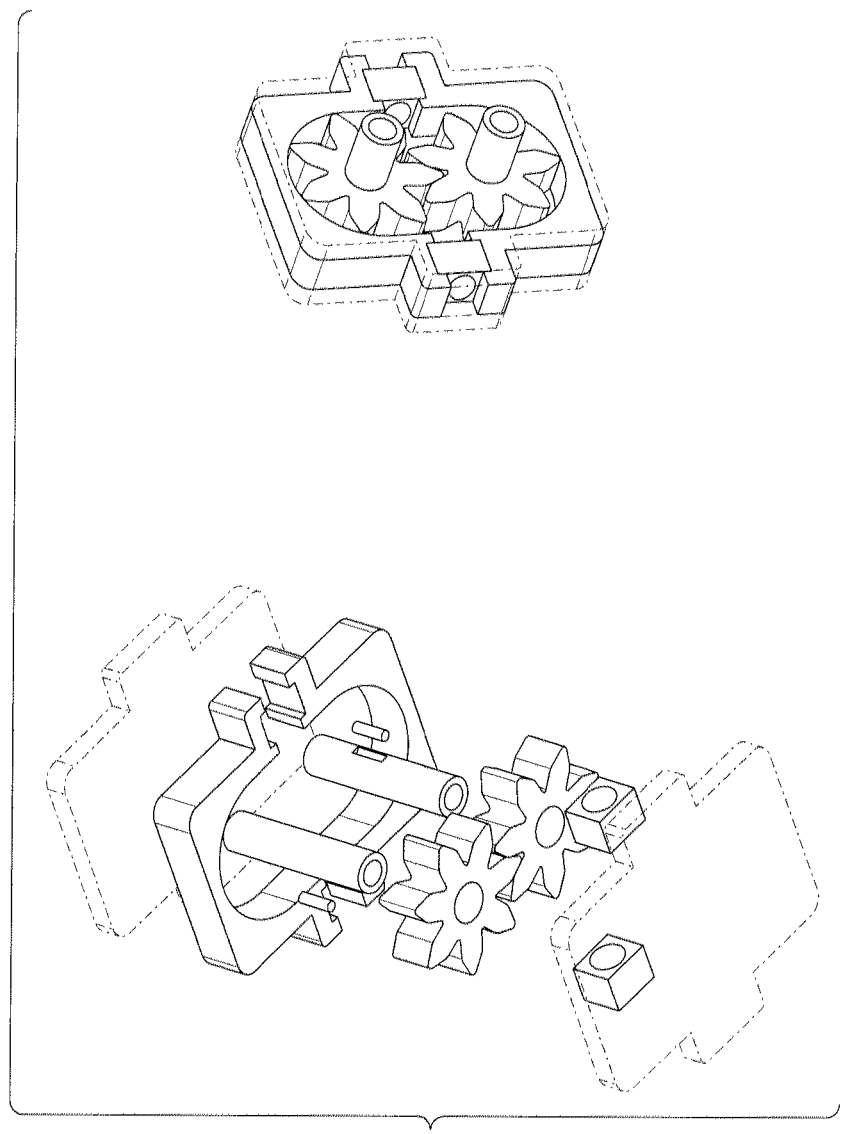
FIG. 7 shows an exploded and internal view of basic gear pump mechanism comprising a gear having gear teeth comprising a catalytically active material according to one embodiment of the invention.
Figure 11:
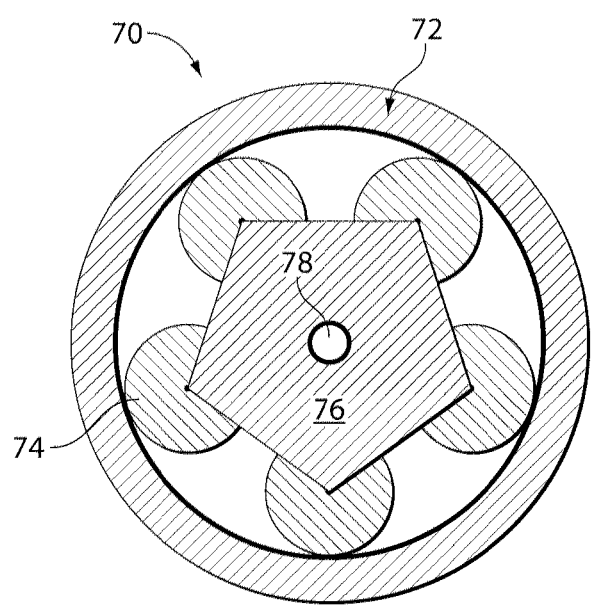
FIG. 11 shows a cross-sectional view of a star roller catalytic object in a cylindrical reactor chamber according to an embodiment of the invention.

As used herein, a "contact-inducing device" refers to any apparatus capable of bringing the catalyst objects into repeated contact with each other. In some embodiments, the contact-inducing device may be an agitation system of a reactor in which the catalytic objects are placed, such as a slurry flow generating apparatus of an industrial scale slurry bubble column reactor or an impeller of an industrial scale continuously stirred tank reactor, for example. In certain embodiments, the contact-inducing device is a mechanical motor-driven apparatus which is configured to physically position the surfaces of at least two catalyst objects in contact with each other. In certain embodiments, a catalytic reactor system may comprise a mechanical mechanism for placing at least two catalyst objects in contact, such that a projected contact area between the two catalytic objects is greater on average than about 1% of the catalytically active total external contact surface area of the catalytic objects. In certain such cases, the mechanical mechanism may be a gear pump, a series of gear pumps, or the like, and the catalyst objects may be in the form of rotatable gears, or teeth thereof, or rollers which are arranged to be in contact with each other and/or other surfaces. FIG. 7 shows an exploded and internal view of basic gear pump mechanism, while FIG. 11 illustrates a catalytic roller assembly.

Catalyst or catalytic objects of the present invention may comprise a plurality of facets, or equivalently "mosaic patches," wherein at least one facet meets an adjacent facet at an edge to form a three-dimensional shape, wherein at least one facet comprises a catalytically active material. In some cases, an individual facet has a surface area greater than 1% of the total external surface area of the catalytic object. In some embodiments, a facet, or portions thereof, may comprise a catalytically active material. The edges where the facets meet may be essentially straight edges or edges which may be altered (e.g., rounded). The facets may have surfaces that are essentially planar or non-planar. It is advantageous if the surface contours of facets of catalyst objects to be brought into contact are complementary, as defined above. Faceted catalytic objects may comprise, in certain embodiments, particulate or pelleted forms having, in certain embodiments, particle sizes typical of those known in the art for particulate catalysts. For example, particle sizes may be in the range of 0.1 mm-25 mm, more typically from 1 mm-10 mm. These catalytic objects may be particularly well suited for use in industrial scale reactors, such as slurry bubble column reactors, fluidized bed reactors, continuously stirred tank reactor.

The shape of the catalyst objects may vary upon a particular application, as described in further detail below. Examples of potentially suitable shapes include, but are not limited to, polyhedrons, such as a truncated icosahedron, cylinders, gears (e.g., gear having gear teeth), etc.

The present invention also describes methods for performing reactions catalyzed by a heterogeneous catalyst. Such methods may comprises acts of exposing at least two catalytic objects, at least one of which has surfaces that are catalytically active, to a defined environment comprising a selected reactant; creating contact between the catalyst objects such that a projected contact area between the two catalytic objects is greater on average than 1% of the catalytically active total external contact surface area of the catalytic objects; and allowing the selected reactant to undergo a chemical reaction at a catalytically active surface to produce a desired product. In certain embodiments, the catalyst objects are immersed in and surrounded by the environment, which may be a solution or pure material in liquid or gas form comprising the predetermined reactant, for example. In certain embodiments, methods of the present invention comprise contacting the catalyst objects in a recurring and transient manner. In some cases, this may result in enhanced performance of the catalyst (e.g., higher yields).

In certain cases, the recurring and transient contact between catalytic objects may advantageously alter at least a portion of the surface area of the catalytic objects, which may affect or enhance catalytic behavior. In one embodiment, a first catalytic object which is initially catalytically active may contact a second catalytic object which is not initially catalytically active, such that the contact causes the second catalytic object to become catalytically active. In another embodiment, the contact may enhance the catalytic behavior of a catalyst object. In one embodiment, the contact may allow the surface of the catalyst objects to become regenerated or "refreshed," enhancing catalytic behavior.

With advancing knowledge of the nature of "states of matter" conventional ideas of solid, liquid or, gas may no longer be sufficient to describe the range of states of matter. It may be advantageous to consider heterogeneous catalyst behavior in the context of knowing that such state differences may be somewhat "fuzzy." A "surface" typically displays far more complexity than the oversimplified image of a visual plane often used to describe it. Many surfaces may become quite active catalytically under appropriate conditions. The conventional model of a sharp boundary at a surface may be misleading for understanding catalytic activity. Fundamentally, a surface of a solid may be viewed as a zone or transition region where closely spaced atomic groups inside the solid taper off as the view looks toward the edge of the surface zone. Inside, the solid components are closely bound but at the surface such bonding may be disturbed.

The term "surface" in much of the conventional catalyst art has been applied in a way that does not reflect a full appreciation of the nature of a surface at its active, small-atomic-scale dimensions. By contrast, certain of the observations of the present invention may be consistent with a concept of catalyst "surface" wherein, atoms in the interior of a catalyst material, well below the nominal "surface" region—the nearest neighbors somewhat below the "surface"—may also significantly influence its "surface" properties. Atoms distributed over larger distances that cover many atom spaces produce long-range processes that also may play an important role. Thus, as described herein, a "surface" is much more a zone than a position.

Known quantum mechanical results support the contention that simply by having surfaces or materials come very close to each other (a few microns or less), forces may arise and virtual particles may come into being. For example, the Casimir effects (Casimir, H. G. B. "On the attraction between two perfectly conducting plates," Proc. Kon. Ned. Akad. van Weten. 1948, Vol. 51, No. 7, pp. 793-796) may naturally occur in the very small scale of the surface zone of catalysts. Casimir effects, though operating in the tiny surface zone domain of catalysis, have typically not been given attention in the field of catalysts.

In the context of the present invention, without being tied to any particular physical phenomena, theory or explanation, it is plausible that the inventive catalytic enhancement due to the contacting of solid phase catalytic surfaces may be due, at least in part, to the phenomenon that as two surfaces approach each other, some quantum uncertainty may influence not only the materials but also the "space" separating the two surface regions. This may be especially true where the two approaching surface regions have similar atoms; in such a case, the uncertainty may dictate that some of one "surface" may be found in the other's "surface." This virtual "tunneling" fuzziness may be only a part of the extraordinarily active zone as two surfaces are brought into proximity.

Brunauer, Emmett and Teller (BET) measurement is a common surface property test used in describing various materials for catalysts. It is a test of wherein the adsorption of a gas is measured on the surface of a material. This approach has been based on a theory of Langmuir regarding the processes of gas adsorption at a surface. A controlled amount of an inert gas under pressure is applied under pressure to the test material. The gas is measured as it is removed by a heating desorption process. BET measurement may be expressed as square meters (of equivalent surface) per gram of material under test. Though the theory of a BET measurement involves many assumptions, the method has become a common specification for catalysts. The conventional thinking behind such a measurement was—the more surface area the better. Conventional belief that all catalytic action is surface controlled, suggests more is always better. Recently, however, more studied analysis has shown this to be not necessarily the case (e.g., see U.S. Pat. No. 6,831,037).

Material surfaces, even when considered relatively smooth, may be relatively rough on the atomic scale. Examples have been visualized with recently developed surface scanning techniques showing many surface peaks and valleys, terraces, and voids, all present in a typically rather uneven way. Another significant aspect of the atomic features of the surface zone is the sizable reach of various forces and influences. In the surface zone, things may not be as sharply defined as the scan images seem to represent. Features often shown atom by atom on a scale of an atom every few millimeters may not convey the lengthy reach of interactions leaping many atoms distance.

Not only is such minute space believed to be significant, also minute time may play an important role. Things may happen not only over a tiny range in space of such atom dimensions but in a time of only a few hundred femtoseconds ($10^{-15}$ second). Therefore, consideration of the extremely small time intervals in which the short-range catalytic molecular actions actually occur may be advantageous in developing improved catalytic processes. Consideration should be given to the very great disparity between the femtoseconds actions of chemical bonding and the much longer time taken by reaction materials to move in and out of the surface zone. Thermal molecular velocities are of the order of hundreds to thousands of meters per second. Thus even a moderate sized molecule may only be in the neighborhood of atomic bonding distance of a hundred or so picometers ($10^{-12}$ meter) for a few hundred femtoseconds. However because of inter-colliding of reactant molecules, the path to and from a surface may be quite indirect and circuitous. Thus the transport of reaction material may often be the limiting factor rather than the time it takes to form a chemical bond. Thus in designing catalyst materials and systems, it may be important to take into account how components of a reaction may get into reaction range and how they may get away. An important concern then arises concerning how much time it takes for a catalyzed molecule to leave the environment once catalyzed in the surface zone. Catalytic activity may possibly have more to do with the ensnaring of materials than with overly simplistic ideas focusing only on the amount of reactive surface area. Catalyzed and reactant materials caught in tortuous interstices that restrain and delay the entering and leaving of materials may have more to do with production rate results than BET measured surface area alone. Even where a gaseous reactant is involved, BET measurements for much the same reason may not necessarily have a dominant impact on the effective reaction rate. Consequently, a large surface area built of a dense forest of porosity may also become an inhibitor of material movement. The cohesiveness (sticking together) of like materials may further impair movement. The landscape of a surface may therefore be one of the contributors to the often very large apparent surface area measured by the gas adsorption test methods. Though past evaluations of some catalyst activity seemed to correlate performance with effective adsorption area, the correlation was often poor. Large BET values can be obtained through increased pores and surface asperities roughening the landscape. If carried too far the forest of surface asperities may have a reverse influence on the catalyst production rate by stalling material transport. Therefore, in certain embodiments of the present invention, the catalytic materials are non-porous or have a relatively low surface porosity.

Heterogeneous solid-phase surface catalysts may in certain instances re-configure or assemble some molecular species of reactants into desired products. Such catalyst actions may take place within very short distances proximate to some surfaces. Some catalysts act, at least in part, by breaking apart particular molecular bonds. Others may produce new bond linkages, for example forming polymers from monomer "building block" molecules. The very short time in which such molecular reactions take place may be an important aspect of all such catalyst behavior. In the atomic scale region of surface activity, such events may occur over extremely short periods of time. Such short time behavior appears to not be appreciated in conventional catalyst research and design. Whether new bonds are created or existing ones are modified by a catalyst, each such step may be a discrete transition occurring in extremely short time—e.g., in the femtosecond domain. The quantized change of energy in such an action may increase or decrease the total energy of the components. The quantized nature of such a transition may substantially limit the applicability of conventional concepts of mechanical resonant energy exchange or storage. (Q is a symbol generally used to represent the ratio of resonant energy stored per cycle to energy lost per cycle). Ideas of a "Q" associated with such state transitions may fail because the changes are not continuous ones. A discrete transition may be better represented in the form of a state diagram, as shown in FIG. 1, in which the vertical direction represents flow of time. Two molecules, one A and one B, (coming from below the wavy line), can interact (the wavy line) through an exchange of a quantum of energy, producing the linked molecule A+B and a quantum of energy (or phonon) into or out of the state as shown at the right of the wavy line. This schematic is presented, not as a complete theory, but merely a graphic clarifying events that may occur in the very brief time of such a reaction. That reaction may be either exothermic (energy released) or endothermic (energy absorbed). The time required for the transition (the wavy line) may be extremely short. In fact it may not be possible to say that the transitioning of entrance states into exit states requires any amount of time whatever. This is an example of the quantum fuzziness issue. The virtue of such a simple diagram lies in representing purely the state differences and the feature changes accompanying the event.

Much of the conventional theoretical treatment of surfaces and catalytic activity by statistically modeling large numbers of elements, which motivates much of the conventional approaches to catalyst design and research, may fall short by not adequately considering individual interactions and their brevity. Many known theoretical and empirical approaches to catalyst chemistry have dealt in a thermodynamic statistical way only with overall averages.

Other surface complexities can also play an important role in catalyst activity. Even regular "continuous" metal films that may display nearly atom-by-atom ordered proximity are rarely smooth on an atomic level. Very pure, nearly perfect semiconductor-crystal materials can approach such an almost atomically perfect surface. It is instructive to consider that even a nearly perfect surface layer may have "defect" properties at its "surface" simply because of the absence of nearest neighbors in the space above its top layer of atoms. Surfaces may differ from their interior or bulk due to discontinuities that may be inherently a property of a "surface" (boundary). If such a semiconductor crystal material were "doped" to be of N-type in its interior (electron rich), its surface may still show some P-type properties (hole rich) because of the missing electron field on the "empty" side of the boundary. Doping of a semiconductor material often may be done with just a minute fraction of atoms (for an N-type silicon, about one in 10,000 atoms of phosphorous). Notably this illustrates some of the extent to which long-range properties (many atom-spaced distances) may contribute to behavior of a surface.

Even atoms within a "solid" array can have a substantial influence on its "surface," arising from constituent material and organization within interior and neighboring surface regions. A certain amount of drift of atoms within such an array may be constantly taking place though the average of the array (shape) may appear unchanged. On the very short distance and short time scale these movements may have influence on opportunities for various reactions to occur. Temperature of the materials may also have influence and may work to raise or lower a particular result as different reactions compete at differing rate, some rising or falling as a result of the balance at a particular temperature.

It has been observed that freshly "cleaved" surfaces obtained by breaking a brittle solid in an ultra-high vacuum have high catalytic activity compared to similar surfaces that are not freshly cleaved. Such ruptured naked surfaces are not yet covered by adsorbed material and can exhibit short-range features known to "hunger" for companions. Such is the exceptionally active nature of a nascent surface. It is believed, in the context of the present invention, that surface-to-surface contact effects may create surface defects creating similar enhanced catalytic activity as for freshly cleaved surfaces. In context of the present invention, the landscape of contacting catalyst surfaces may be changed by each fresh separation following each contact. Again, without being tied to any particular theory or explanation, it is believed that such changes may produce a new crop of surface defects with each separation accounting, at least in part, to the enhanced catalytic activity and performance achievable with certain embodiments of the present invention. Much conventional research and development in the area of heterogeneous catalysis intensely pursued large values of measured surface gas-adsorption area. This may have encouraged the development of counterproductive surface complexity that opposes catalytic product output. The typical conventional approaches to catalyst formulation emphasizing particular empirically derived "recipes" of materials provide little direction for variation or improvement of the catalytic chemical objective of the catalyst. Consequently, much past development was the result of documenting painstaking experimental work and historical operating experience using established catalyst systems or modest variations thereof. Further improvement in catalyst productivity requires attention to directly improving catalyst activity and to increasing transport of material through surface zones. The present invention, in certain embodiments, provides materials and methods for accomplishing such improvements.

This present invention is not limited to any particular catalyst recipe or use for any particular reactant input/product output nor is it specifically limited in its use to any particular reaction scheme. Examples of catalytic procedures that may be suitable for use in the invention include, but are not limited to, cracking (e.g., steam cracking, fluid catalytic cracking, hydrocracking, thermal cracking, and the like), catalytic reforming, acetoxylation, alkylation, ammonolysis, carbonylation, Fischer-Tropsch synthesis, alkane production, pyridine production, dehydration (e.g., dehydration of alcohols), dehydrochlorination, dehydrogenation, epoxidation, hydration, hydrochlorination, hydrogenation, hydrogenolysis, isomerization, oxidation, reduction, oxychlorination, petroleum refining, and production of synthesis gas and/or products of synthesis gas. Examples of catalysts and/or catalyst materials that may be utilized in the invention include, but are not limited to, nickel such as Raney Ni or Urushibara Ni, vanadium(V) oxide, platinum, palladium, rhodium, ruthenium, alumina, silica, platinum rhodium palladium catalysts, Zielger-Natta catalyst, Grubbs' catalyst, Lindlar's catalyst, Wilkinson's catalyst, Crabtree's catalyst, catalyst supported on carbon, alumina, or other materials, derivatives thereof, combinations thereof, and the like. Other catalysts and catalytic procedures that may be employed in accordance with the present invention are described in Rase, H. F., *Handbook of Commercial Catalysts*, 1$^{st}$ Ed., CRC Press, 2000, which is incorporated herein by reference.

In fact, the systems, materials, and methods disclosed herein may potentially be utilized in the context of essentially any solid-phase heterogeneous catalyst composition for any appropriate catalytic reaction scheme. Such compositions and reactions are extremely well known in the art. The disclosed invention may generally apply to essentially any catalyst employing surface-active solid-phase catalyst materials acting on heterogeneous reactant matter. It is generally applicable to the field of heterogeneous catalysis with surface-active solid-phase catalysts broadly as defined within this disclosure and by the appended claims.

At least two different types of phenomena may influence the output rates of a catalyst: First, phenomena acting catalytically upon the desired chemical bonds in the surface zones; second, phenomena acting to affect transport of surrounding material, to and from, the surface zones.

Enhanced clearing of trapped surface zone material may be provided by the surface-contacting action of the present invention, which may improve catalytic activity. In certain embodiments, more surface clearing may be achieved by adding radiant energy to the active catalyst surface zones to yield even further improvement in catalyst output results. This radiant energy can aid the lagging movement of materials to and from the surface zones.

As discussed above surface contact may be more complex than previously appreciated in the field of catalysis. Even slight surface contact may produce significant surface changes and defects. Some embodiments, of the present invention employ deliberate recurring transient physical contact between solid-phase catalyst surfaces to enhance the catalyst's action upon the target reactant materials.

Certain embodiments of the present invention involve new catalyst surface geometries designed to facilitate and increase the projected contact area of surface-to-surface contact events. Catalyst reactor systems and/or catalytic objects of certain embodiments of the present invention are configured to produce frequent surface-to-surface contact between catalyst objects, using, in certain embodiments, inventive catalyst shapes and/or catalyst movement in, for example, catalytic reactors of the invention. In certain embodiments, catalyst objects used are designed to provide large contact area (e.g., projected contact area) between a catalytically active surface and another surface, which also may be catalytically active, which may be the same or different in composition, and which may have surfaces that are complementary in shape and topography facilitating large areas of intimate contact. Such shapes differ greatly from those typically used in conventional catalytic processes, which are typically spheroids or include similar curved, non-complementary surface shapes. Contact between spheres, especially hard spheres, and other similar small radius-of-curvature items, provides only extremely limited contact area. Typical contact between hard spheres will typically be very much less than one five-thousandth of the individual object's surface area. Under the conditions typically found in prior art, spherically shaped catalyst objects coming into contact with one another produce insignificant contact area in contrast to the catalytic object shapes provided according to certain embodiments of the present invention described in more detail below. In contrast, certain catalyst objects of the present invention, e.g. catalyst particles or pellets, may comprise a plurality of facets (e.g., essentially planar facets) or mosaic patches on the external surface. In some embodiments, two such catalytic objects coming into contact with each other may be shaped to have complementary surfaces such that, for a given contact event, a projected contact area between the two catalytic objects is (on average over a large number of contacts) greater than 1% of the catalytically active total external contact surface area of the catalytic objects. Examples of shapes provided according to the present invention include, but are not limited to, a variety of polyhedrons, such as an icosahedron, truncated icosahedron (TICO), cylinder having a polygonal perimetric shape, gear teeth of a gear, and the like. Those of ordinary skill in the art will readily envision a wide variety of other suitable shapes, each of which is included within the scope of the invention as defined by the appended claims. The inventive catalytic reaction systems may further include a contact-inducing device which is configured and arranged to bring catalytic objects into contact with each other in the presence of a selected reactant environment to produce a desired reaction product. In certain embodiments, the catalytic object(s) may be contained in a reactor comprising an inlet for introducing a reactant to the reactor and an outlet through which passes from the reactor a product stream. The reactors of the invention may take many forms that facilitate the creation of repetitive contact between catalyst objects therein. For example, convention designs, or modifications thereof, comprising continuously stirred tank reactors (CSTRs), fluidized bed reactors, slurry bubble column reactors, etc. may be employed. In addition, in certain embodiments the invention also provides new reactor designs employing, in certain cases, mechanical apparatuses for creating repeating contact between catalyst objects (e.g., see description of gear pump and roller reactor designs below). In some embodiments, the catalyst object is formed of a catalytically active material. In some embodiments, the catalyst object comprises an inert support material (e.g., a ceramic) coated on at least a portion of its surface with a catalytically active material.

In certain embodiments, the shape of the catalyst surface provide broad areas of contact, e.g. as with complementary shapes. This provides catalyst object geometries that are very different from typical prior art catalysts and, accordingly, to inventive systems that employ such catalysts. With discrete independent catalyst objects, certain inventive catalytic reactor systems may also cause the objects to move about such that the catalyst objects frequently collide in a fashion that they make substantial surface contact with one another in the reactant medium utilized. This can be achieved by placing the catalyst objects in certain environments, such as gaseous, liquid or mixed media, and providing a contact-inducing device (e.g., a device for agitating the environment). Such agitation has been employed in three-phase reactors such as slurry bubble column reactors, in continuously stirred tank reactors, and a variety of other configurations. However, conventional catalytic reactors that have agitation do not provide the enhanced contact conditions of the present invention because typical prior art catalyst object designs do not possess the surface-to-surface contact enhancing properties of certain embodiments of the present invention.

In some embodiments, catalyst objects of the present invention may be used in combination with a contact-inducing device capable of providing agitation or motion to an environment comprising the catalyst objects and a reactant. For example, the many essentially flat facets of a polyhedron shape, such as the TICO shape described below, may readily engage in repetitive contact events action when a reactant volume densely filled with such objects is agitated or stirred in a reactor. These inventive shaped supported catalysts when used in sufficient quantity to provide a high density-of-fill may produce with moderate agitation the desired numerous and frequent recurring contacting between their many faces (which may be essentially flat or of complementary contour). Continuously stirred tank reactors (CSTRs) known in the art can be an appropriate apparatus for such a process use. In addition to CSTRs, widely employed Slurry Bubble Column Reactor systems that utilize bubbling gas to agitate for example a Fischer-Tropsch type of hydrocarbon synthesis reaction may also be used in conjunction with catalysts of the present invention, such as a TICO type catalyst. In certain embodiments, especially those employing a large number of agitated catalyst objects in the form of particle-like objects, it may be desirable to avoid a three-dimensionally shaped catalyst object that is symmetric in a manner that permits aggregation (e.g., "lock-up") when many catalyst objects are close packed. For example, this may occur with cubic block-shaped objects upon agitation. In certain embodiments, catalyst object forms are provided that allow the desired frequent surface-to-surface contact event but minimize tendency to aggregate in a locking fashion. Inventive asymmetries are exemplified in the several examples given below; however, there are many other geometric possibilities meeting this need that will occur to those skilled in the art.

In certain embodiments, a mechanical actuator, mechanism or apparatus to which at least one catalytic object is attached or mechanically interconnected may be employed to place at least two catalyst objects (or one catalyst object and a non-catalytic object) into contact, such that a projected contact area between the two objects is greater on average than about 1% of the catalytically active total external contact surface area of the catalytic object(s). For example, systems in which meshing gear teeth, which include a surface comprising a catalytically active material, contact a reactant may be used (e.g. see FIG. 7). There are many presently known forms of gear pumps that may serve such function by positioning the catalytically active gear teeth in an interdigitated fashion and rotating the gears, creating contact between surfaces of the gear teeth. Additionally, an inlet and outlet may be included in the catalyst reactor system such that reactant material may be circulated over the catalyst objects, for example at least in part due to convection created by the moving gears.

Other embodiments of the present invention may additionally employ cylindrical reaction chambers or pipes comprising an interior surface which may be made catalytically active. When brought into contact with other object(s), such as other catalytic object(s) of a similar composition, in a suitable reactant environment, contact events of the other contacting object(s) with the catalytically active interior external surface of the reaction chamber may produce the desired contact conditions to promote enhanced catalytic behavior. Systems of this kind may be readily applied to circulate fluids, gases and such thus combining desired fluid moving functions with intended catalytic processes.

A exemplary configuration for utilizing shaped contacting catalytic surfaces employing gear teeth having catalytically active surfaces on the teeth id shown in FIG. 7. Such gears naturally operate producing rapid transient effective surface-to-surface contact on each engaging tooth surface. Gear pump devices are known having specially shaped contacting teeth suitable for fluid pumping. Many forms of commercial gear pumps exist. Such a mechanism combines surface contacting functions with fluid pumping functions often useful for many catalyst processes. Such catalytic gear pump-like systems have uniquely effective uses considering their natural high-pressure capability along with large flow rate capabilities under even extreme temperature conditions. By having a desired catalytically active surface material on the engaging gear pump teeth, the conditions for the subject system can be achieved in a variety of otherwise difficult conditions. Well established processes may be used for depositing catalytic materials on such gear tooth surfaces.

Another configuration of this type employs multiple individual gear pumps. These may be used inside a reactor to produce mixing and agitation of the reactant materials within it. Such devices often utilize the action of two or more gears rotating together so that fluid is swept into the merging teeth and exits on the parting teeth side of such an arrangement. There are many forms of this kind of device known in the art. Some employ multiple gears, some planetary systems. Teeth of varied forms can be used in such systems.

It may be desirable for the engagement of such teeth to develop the largest contact area and travel over each tooth face that is coated with the appropriate catalyst material. The pressure between the teeth may also be maintained by an appropriate force generating motor or other mechanism for exerting just enough force to insure significant engaging contact over the fullest extent of tooth surface possible.

Another configuration for such a gear pump system may be a serial arrangement of fluid travel from one gear pump to a next one seriatim to create an extensive surface coverage by a circulated fluid reactant.

Another property which may be convenient for catalyst processes is the ability of such pumps to operate in very high-pressure conditions. This type of pump can either generate such pressures or operate the engaging gears without any housing containment simply inside a controlled reactant chamber environment. The gear engaging system may be configured and operated to develop sufficient total surface-active contact area and, to run high enough gear speeds to optimize contacting action so as to obtain the desired output of reacted product. The tooth shape may be any one of the well-known types designed for angled or helical or other geometries that increase the available contact area on each tooth engagement.

The patent literature shows many examples of pump designs potentially adaptable to the applications described. For example, two such pump structures are described in U.S. Pat. Nos. 5,660,531 and 6,518,684.

Another embodiment of the present invention may involve a catalytic reactor system comprising catalyst objects configured in the shape of a roller bearing arranged to create the multiple contacting and separating action modality of certain aspects of the present invention (see FIG. 11). The roller bearing surfaces may be coated with a catalytically active material. Structures of this type can be immersed within a reactant medium within a reactor or in a flow stream of such a reactor. This type of embodiment with appropriately designed materials may also facilitate use with a very wide range of temperature and/or pressure.

FIG. 11 illustrates an embodiment of an inventive catalytic reactor system 70 that need not employ catalyst pellets or particles but rather uses the containment vessel, with an inner surface 72, and a mechanism that also provides agitation and stirring action of catalytic objects. Cylindrical reactor 70 includes a series of spring loaded rollers 74, which are coated with a catalytically active material, arranged on a carrier 76 which is rotated about a central shaft 78. Reactor 70 may further comprise inlets and outlets, not pictured, to allow for the circulation of reactant material within the reactor vessel. The rollers 74 and/or the internal surface 72 of the reactor containment vessel that they contact and press on may be coated with a desired catalytically active surface material. Carrier 76 rotates the rollers 74 to make interrupted contacting events on particular areas of the catalytic surfaces of rollers 74 and/or surface 72. The rotation also provides a way of agitating and stirring the contents (e.g., reactant material). Such a vessel can be either batch or continuous flow operated. The particular geometry illustrated is but one case of many possible configurations as would be appreciated by those skilled in the art. This inventive structure can be constructed in essentially any size deemed appropriate for the objectives selected. Cylindrical containment vessels also advantageously lend themselves to extremes of operating pressure and temperature. Magnetic coupling can be used to generate rotation of carrier 76 in a sealed systems.

In another embodiment, gear pump systems like those discussed above can optionally be combined with a system as illustrated in FIG. 11 for pressure and flow advantages. The flexibility of the inventive catalytic reactor systems illustrate the many possibilities for performing several different kinds of these reactions on a feedstock stream by coupling varied reactor configurations. This can be done serially or as a branching network thus lending itself to many flexible integrated industrial process configurations within the scope of the invention.

Certain embodiments of the invention comprise the use of an anvil/striker catalytic reactor apparatus, which in certain embodiments may be sized and configured to be particularly well suited for smaller-scale analytical testing, experimentation, process/materials optimization, and comparative testing applications. Two such embodiments are shown in FIGS. 12 and 13, respectively, which, as explained in more detail below and as shown in the Examples 6-15, may be especially useful as a pilot-scale testing and analysis devices.

Figure 12A:
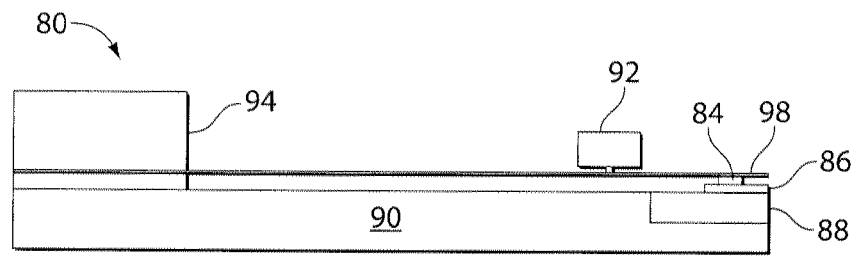
FIGS. 12A-12C show a cross-sectional view (FIG. 12A) and top views (FIGS. 12B and 12C) of an anvil/striker catalytic object reactor test apparatus according to an embodiment of the invention.
Figure 12B:
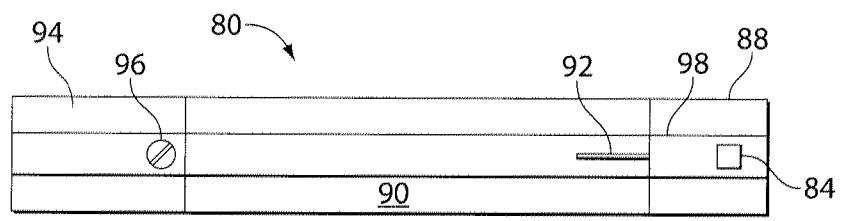
Figure 12C:
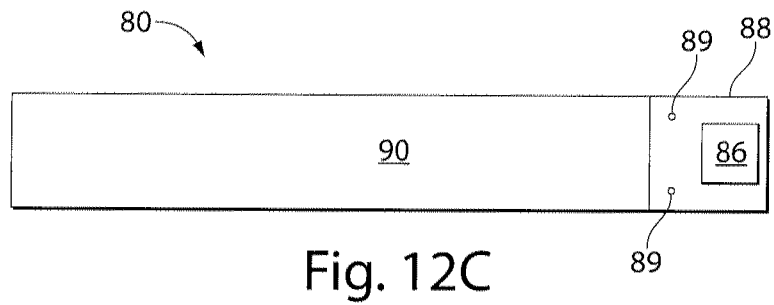
Figure 13:
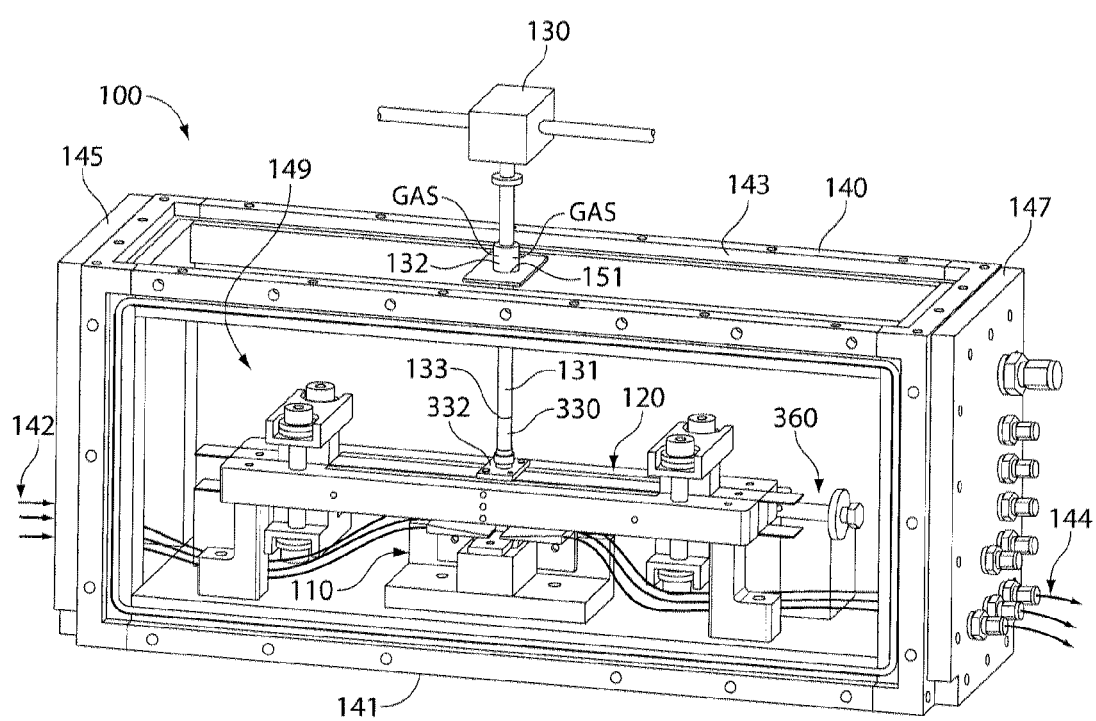
FIG. 13 shows an anvil/striker catalytic reactor test apparatus according to one embodiment of the invention.

FIG. 12A provides a cross-sectional view of an exemplary embodiment of an anvil/striker catalytic reactor apparatus 80. FIG. 12B shows a top-view illustration of the striker apparatus, while FIG. 12C shows a top-view illustration of the anvil apparatus. As shown in FIG. 12B, a striker contact 84 is positioned on a bottom side of striker leaf 98, and an eddy-current sail 92 is positioned on a top side of striker leaf 98. Striker leaf 98 is held in an elevated position by striker base 94. As shown in FIG. 12C, anvil apparatus 80 includes an anvil base 90 and an anvil carrier plate 88 positioned on a portion of the anvil base 90 such that the anvil carrier plate 88 has a top surface essentially flush with the surface of the anvil base 90. The anvil carrier plate may be aligned with pins 89. An anvil contact 86 is positioned on a portion of the anvil carrier plate 88. In the anvil/striker apparatus 80, striker apparatus 98 is positioned on top of the anvil apparatus such that anvil base 94 contacts a portion of anvil base 90. Also, striker leaf 98 is positioned above the anvil apparatus such that striker contact 84 is positioned directly above anvil contact 86.

The anvil contact 86 and striker contact 84 may be soldered to the anvil carrier plate 89 and the striker leaf 98, respectively. The solder may preferably be a high temperature gold/silicon type such as those used in semiconductor structures. A thin foil (<0.002") of such solder may fuse each of these metal parts in a reducing atmosphere furnace. One or both of anvil contact 86 and striker contact 84 may comprise a catalytic material. This type of assembly preserves the flatness and parallel form of the parts. The design allows repeated tests with different catalysts to maintain identical operating behavior.

In this configuration, striker contact 84 is capable of contacting anvil contact 86 by movement of striker leaf 98. Screw 96 may be used to control the force with which striker contact 84 contacts anvil contact 86. In the illustrative embodiment, the anvil contact 86 has a larger surface area than the striker contact 84. For example, the anvil contact may have a surface dimension of 5 mm×5 mm, while the striker contact may have a surface dimension of 2 mm×2 mm.

The anvil contact 86 and/or striker contact 84 may be coated with a catalytically active material, as described above. The striker contact 84 may be brought into contact with the anvil contact 86 such that a catalyzed product is formed on the area of contact (e.g., the surface area of the striker contact and the "struck" portion of the anvil contact).

The excess or "un-struck" area of the anvil contact (for example, a 1.5 mm wide frame having 21 mm$^2$ of anvil surface) is exposed to the same environment, however will show substantially less catalyzed product on its surface than on the 2×2 "struck" area (4 mm$^2$).

Various catalyst materials, reactant materials, operating temperatures and pressures, etc., can be tested with the present system.

Referring to FIG. 13, a second exemplary embodiment of an anvil/striker catalytic reactor apparatus 100 containing an anvil/striker assembly within an enclosure 140 is illustrated. An embodiment of this apparatus is described in much greater detail below in Example 6 and is described here only briefly. Striker assembly 120 is positioned relative to anvil assembly 110 such that the striker can come into controllable and repeated contact with the anvil. The striker assembly 120 may be connected to an electromagnetic drive system, e.g. inductive coil driven linear actuator 130, which can measure and control the positioning and movement of the striker and the applied force during contact events. In the illustrated embodiment, a gas bearing 132 used provide a very low friction passage through enclosure 140 of push rod 131, which drives the striker 300 (FIG. 15) A set of inlets 142 can introduce reactant material, such as reactant gas, into apparatus 100, and a set of outlets 144 can be used to evacuate the reactant gas from apparatus 100. In certain embodiments, each of the three illustrated reactant inlets 142 and product outlets 144 can be in fluid communication with different portions of the catalytically active surface area of the anvil 200 (FIG. 14) of the anvil assembly 110 (e.g. struck and unstruck portions of the anvil in the illustrated example).

The techniques of present invention are not believed to be limited in their utility to particular catalyst materials or catalyzed reactions and may be applied to a wide range of surface-active catalysts and reactions able to be catalyzed by these catalysts. Essentially the entire known catalog of surface-active catalysts may potentially be benefit by application of the surface-to-surface contacting systems and configurations of certain embodiments of the present invention. Catalyst materials other than metals, such as oxides or ceramics, may be able to benefit from effective contact events within the context of the present invention. Those of ordinary skill in the arts of heterogeneous catalysis, using no more than the knowledge and resources available to those skilled in this art, given the teaching and guidance provided in the context of the present invention, will be able, without undue experimentation and burden, to select appropriate catalytic materials for a particular desired reaction and to fabricate such catalytic materials into the catalyst objects and catalytic reactor systems of the present invention. Those of ordinary skill in the art will be able to perform screening rests and routine testing and optimization, e.g. such tests may performed in a similar fashion as the procedures described below in the Examples 6-15, to select appropriate or optimal conditions for implementing the inventive techniques involving creating and/or enhancing surface contact of catalytic objects and to confirm that the inventive techniques yield increased catalytic activity in their chosen system.

In some embodiments, catalyst reactor systems of the present invention may comprise a catalytically active material that forms a catalytic object or that is present on at least a portion of the surface of the catalyst object. Catalytically active materials are known in the art, and can be chosen to suit a particular application. In certain embodiments, combinations of metals such as alloys or other metallic mixtures can provide advantages for specific catalytic activity. For example, combinations, in which the different components have different valence or oxidation properties may produce more active sites for catalysis upon contact with like surfaces. In selecting metal atoms for such combinations, elements from adjacent periodic table columns may be chosen. For example, a transition metal from a certain column on the periodic table may be alloyed with a transition metal from an adjacent column, such as a preceding column or a following column. Examples of such combinations may include elements from at least two of columns 9, 10, and 11 of the periodic table. For example, a transition metal from group 10 (e.g., nickel, palladium, platinum) may be alloyed with a small amount (e.g., 0.05 wt %, 0.10 wt %, 0.25 wt %, 0.50 wt %. 0.75 wt %, 1.0 wt %, 5.0 wt %, 10 wt %) of a transition metal from adjacent column 9 (e.g., cobalt, rhodium, iridium, etc.) In a specific embodiment, palladium metal may be alloyed with 0.25 wt % iridium.

Inventive systems employing the enhanced catalyst contacting techniques and configurations described above may be useful in ameliorating the often problematic, "regeneration" and refreshing operations common with industrial catalytic operations. Surface-to-surface contact may act, at least in part, as a form of continuous regeneration or re-activation. In addition to significant improvement in catalytic action the present invention may, in certain embodiments, enable increased selectivity for resultant products by permitting a greater range of operating parameters to be utilized. The present invention may make possible utilization of conditions not previously effective or practical in conventional systems.

Many configurations are possible within the context of the present invention. Presented below are examples which should be considered non-limiting cases of a very large scope of possible applications and configurations within the scope of the present invention. Others will occur to those skilled in the arts; therefore only the appended claims should define the limits of the inventive subject matter.

In another embodiment, the catalyst reactor system may be operated at supercritical conditions (of temperature and pressure) to obtain a desired molecular species for catalytic reaction. This can be done in a more or less continuous fashion or because of the severity of such thermodynamically active conditions it may be done transiently in a repetitive manner to lessen the burden of such extreme conditions on materials and equipment.

Other embodiments of the present invention may improve the transport and release of catalyzed material and reactant to, from, and/or in the surface zone. Though the system's contacting action itself may also facilitate significant benefit in material transport, such effect may be further enhanced in certain embodiments by application of radiant energy. The exciting action of radiant energy incident on the catalyst (for example, sonic, ultra-sonic, photonic, particle and/or electromagnetic energy) may improve the movement of material to, from, and/or through the surface zone. As indicated above, the entrainment of materials in the surface zone from micro cavities or cohesion can be a retarding process with a time factor many times that required by the actual catalytic transformation.

Catalyst objects of the present invention may, in certain embodiments, be configured as particles or pellets that have geometries including multiple projected contact areas and/or facets/mosaic patches, each having an external surface area typically 1%, 2%, 3%, 4%, 5%, 6%, 7%, 8%, 9%, 10% or more of the total active external surface area of an individual catalyst object. The principle of the subject system may be realized in a wide variety of sizes, shapes and configurations, which may be chosen for a particular application, that provide significant projected contact area greater than 1% of the total external active surface area of an individual catalyst object. One illustrative shape is the cylindrically symmetric catalyst object with nine longitudinal flat facets along its long axis surface shown in FIGS. 8 and 10. Other shapes will suggest themselves to those skilled in the arts when considering the possibilities for application of the principles of the subject invention. Differing desired conditions of use and economic factors also affect such choices.

The catalyst objects may be a solid catalyst material, a layered construction, a hollowed structure, or the like. For example, nickel metal often used in catalysts might be used in a solid form, its shape conforming in principle to the multi-faceted construction of certain embodiments of the present invention. Many configurations for such action are conceivable within the scope of the present invention.

For certain applications of the present invention small specially shaped catalyst objects may be desirable. Supported catalyst objects may be utilized for reasons of freedom in shaping the objects and for economy of manufacture. For example, ceramic materials may be utilized for supported catalyst substrates. Stability, high temperature endurance and chemically inert qualities may make ceramics suitable for a wide range of process conditions. As discussed previously the present invention provides inventive catalyst geometries. In order to form such geometries, effective methods for molding shapes more complex and precise than can readily be achieved with extrusion methods common for fabrication of ceramic materials may be advantageously employed. Use of such a molding process may be advantageous for achieving the degree of shape asymmetries discussed above as being useful to avoid locking behavior of catalyst objects whose shapes interlock too easily when densely filling the reaction space.

In certain embodiments, materials that can be produced in powdered form can be mixed with thermally moldable plastics and formed into a desired shape using known powder injection molding (PIM) techniques. These methods have been developed to allow the very productive and economical technologies of plastic molding to be realized for the fabrication of metal and ceramic parts. When ceramic powders are used, such methods are sometimes called ceramic injection molding (CIM). Among such technologies CIM processes employing alumina ceramic may be particularly useful for forming catalyst substrates. Such methods may be utilized for the fabrication of many catalyst objects within the scope of the present invention. Materials for performing such methods are available from BASF AG of Ludwigshafen, Germany, who also publish guides and handbooks describing fabrication methods (see Piotter, et al., *Sadhana*, Vol. 28, Parts 1 & 2, February/April 2003, 299-306).

Some references describing conventional catalyst processes employing supported conventional ceramic catalyst carriers have reported significant wear from abrasion caused by agitation. Conventionally, concerns have been directed to minimizing effects of mechanical wear of the ceramic substrates they employed. The approach generally taken was through manipulation of the composition and processing of the ceramic. The generally recognized phenomenon of such wear has been dubbed "attrition" of the catalyst. Wear particle detritus common from such behavior have been given a special name—"fines." Such fines particles not only clog filters and interfere with process machinery but that wear may also result in reduced catalytic activity. Current ceramic technology has employed additives to a pure aluminum oxide ceramic very often used for catalyst support substrate material. Titania (titanium oxide powder) with other material added to it (for example barium in a lesser proportion) has been blended in to improve resistance to attrition. Durable fully sintered pure alumina molded parts produced by the CIM process described may be adequate for many uses but wear factors should be considered for each specific process in selecting substrate shape, materials and processing conditions. To improve abrasion resistance an alumina material (e.g., AO-F alumina available from BASF) may be blended with one to five percent titania powder with the optional addition of one percent or less of barium to neutralize any sulfate content affecting abrasion performance.

The function and advantage of these and other embodiments of the present invention may be more fully understood from the examples below. The following examples, while illustrative of certain embodiments of the invention, do not exemplify the full scope of the invention.

EXAMPLES

Prophetic Example 1

Manufacture of a Catalyst Object

Catalyst objects are made using moldable alumina powder material sold under the trade name Catamold® type AO-F available from BASF AG of Ludwigshafen, Germany and their distributors in other countries. The AO-F material is made of a 99.8% purity aluminum oxide that is compounded as a finely divided powder blended with about 20% polyacetal plastic material. This enables it to be handled and molded like a plastic using existing screw plasticizing molding equipment. Even complex shapes are possible with such techniques. The full process as described below exists as a commercial operation used routinely to produce ceramic molded parts. The parts as first molded by such a process actually are not yet fully ceramic, requiring two processing steps beyond the plastic molding step to become hardened durable ceramic shapes. Because of the amount of plastic material added to make possible the plastic molding process, as-molded parts are designed to be for example 20 percent larger than desired for the finished part. The particular polyacetal plastic chosen for the added material enables such molded parts ("green" parts) to be chemically treated to eliminate all the added plastic. This is done in a process the first step of which gradually raises the room temperature parts (at a rate of 3° C. per minute) until stable at 270° C. In that heated environment the green parts are then exposed to nitric acid vapor for about one hour. This process, called "debinding," rapidly converts to a gas all the plastic in the molded part. Thus debound, devoid of the polyacetal, somewhat porous but firmly and precisely shaped, the now "brown" parts are in the second step directly carried into a sintering operation. The temperature is gradually increased at 3° C. per minute during the next 7½-hour period arriving at the full sintering temperature of 1610° C. After remaining there for about an hour the parts are slightly more rapidly cooled at 5° C. per minute to 400° C. then further slowly cooled at 3° C. per minute to 50° C. or room temperature. The now fully hardened solid shaped parts can be handled, ready for any further steps.

This sintering cycle accomplishes several purposes: 1) it precisely shrinks the parts to the designed size; 2) it fuses the part into a non-porous precisely shaped solid ceramic such that; 3) the resulting surfaces then become hard and glassy-smooth. For beneficial control and economy, the entire debinding and sintering operation cycle can be done in one continuous automated "pusher" type tunnel furnace system.

The surfaces of parts so sintered emerge from processing well-suited for coating with any of a variety of catalytically active materials desired, for example, palladium or platinum metals or combinations as described above. The foregoing methods can be utilized as the fabrication technique for the supported catalyst object examples given below. Economic advantage and shape possibilities using this CIM molding and sintering process make it potentially valuable for application for forming the catalytic objects of the present invention.

Prophetic Example 2

Manufacture of a Supported Catalyst Shape

This example illustrates manufacture of one selected shape for a moderate sized supported catalyst object about 3 mm in diameter that has multiple advantages over a sphere.

Figure 2:
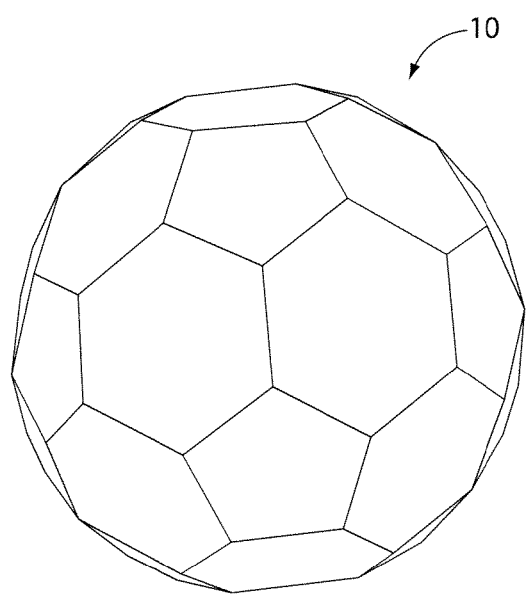
FIG. 2 shows a perspective view of a Truncated Icosahedron.
Figure 3:
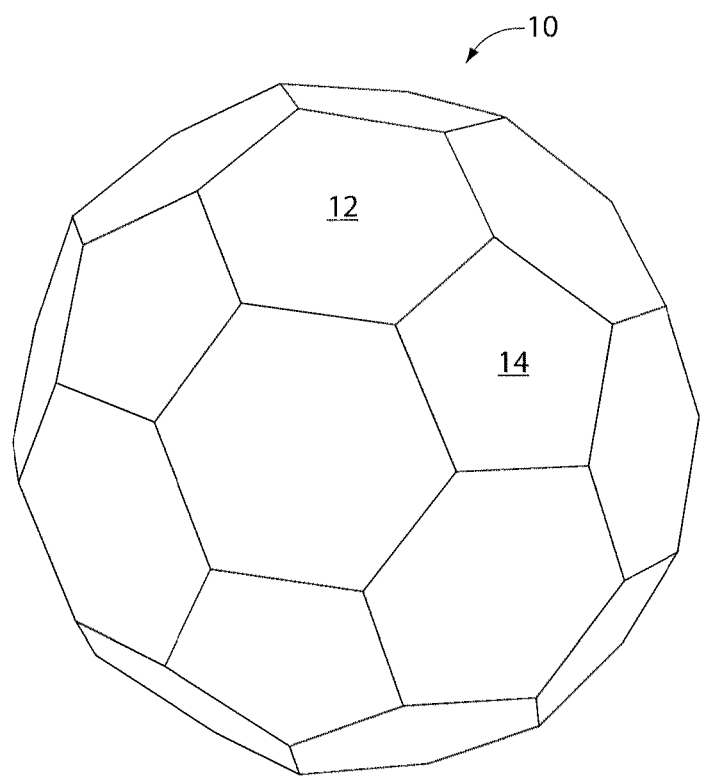
FIG. 3 shows a perspective view of a geometrically ideal Truncated Icosahedron.

The shape of the catalyst object is essentially a truncated icosahedron 10, as shown in FIG. 3, a variant of a soccer ball shape, having thirty-two essentially flat planar faces, twenty of which are hexagonal faces 12 and twelve of which are pentagonal faces 14. (The Euclidian ideal geometric form of truncated icosahedron 10 is shown in FIG. 2.) The catalyst object has general spherical symmetry yet provides relatively increased projected contact area when compared to a sphere, as each of the thirty-two projected contact areas may be greater in surface area than a few percent of the object's total external surface area. The total surface area of this particular polyhedral shape is over forty eight percent larger than a sphere of the same nominal diameter.

Figure 4A:
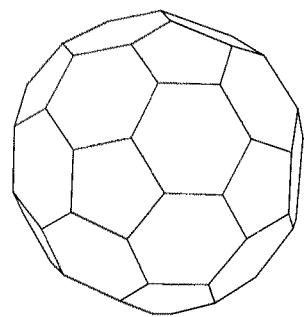
FIGS. 4A and 4B show a view of all thirty-two faces of a Truncated Icosahedron laid flat and adjoining (FIG. 4B) showing relationship of faces.
Figure 4B:
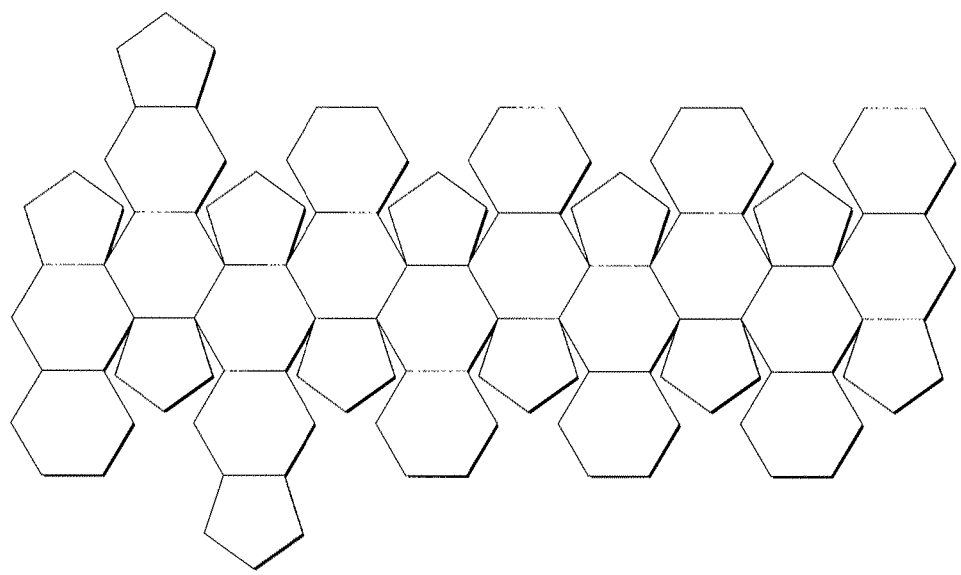

FIG. 4A shows another view of a truncated icosahedron, while FIG. 4B shows a view of all thirty-two faces of the truncated icosahedron laid flat and adjoining showing the relationship of the faces.

Figure 5:
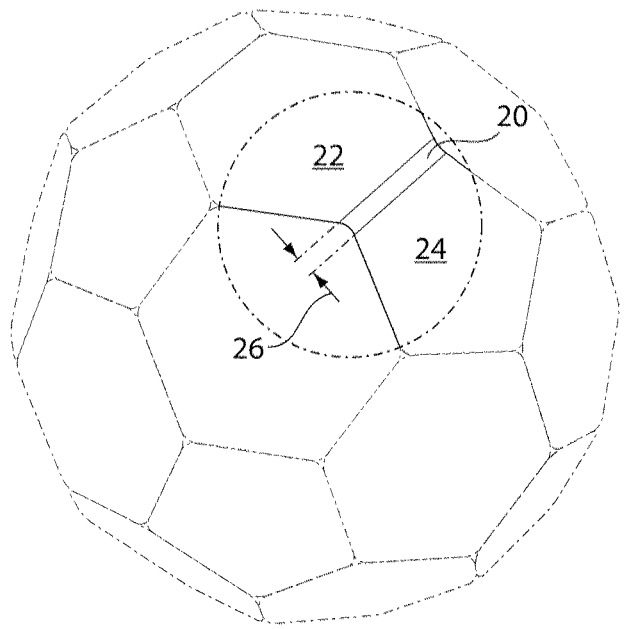
FIG. 5 shows the shape of softened TICO facet edges of a Truncated Icosahedron (e.g.

To synthesize a catalyst in the shape of a truncated icosahedron, a ceramic supported catalyst substrate having the desired shape is formed by the CIM methods described in Example 1 above. The ceramic substrate is then coated with selected catalyst material. For reasons of durability and ease of fabrication the shape is modified in several ways from its ideal soccer ball shape. This modified shape hereafter is called a TICO. First, the sixty edges of the facets are rounded or "softened." As shown in FIG. 5, facets 22 and 24 meet at edge 20, which is slightly rounded to eliminate the sharp edge giving rounded smooth facet-edges having a radius of curvature 26 of about 0.08 mm.

Figure 6:
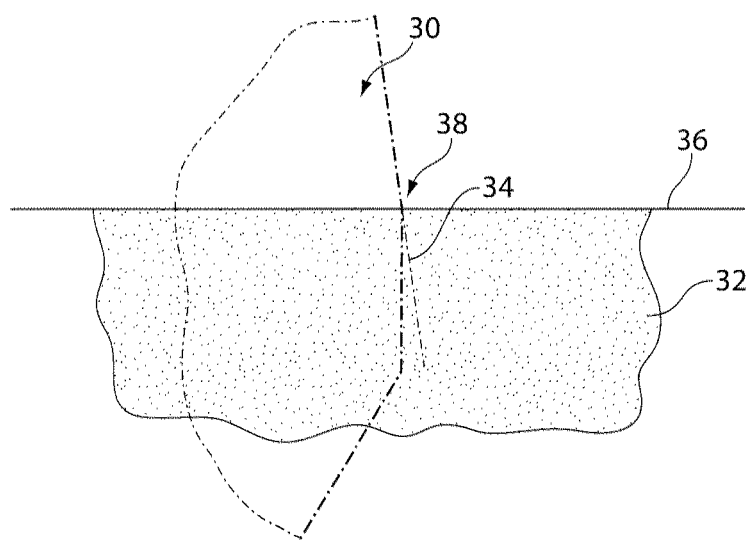
FIG. 6 shows a cross-sectional view of a tilted Truncated Icosahedron TICO facet plane, intersecting the mold parting face (parting line)

Also, in embodiments where the catalyst object is synthesized using a mold, the facet angle at the part-line of a mold may be less than 90° to aid in release of the catalyst object from the mold. FIG. 6 shows a catalyst object 30 having a facet 38 adjacent to a mid-plane parting-line 36 of a mold 32. Line 34 illustrates a 90° angle at mold part-line 36. The facet 38 may preferably be slightly tilted so these adjoining faces make an angle slightly less than 90°, with respect to the plane of the parting-line. (The parting line is the open face of the mold for such parts.) This facilitates the molded parts being more easily released from the mold cavity thus avoiding a part too large to leave the mold cavity. The half cavity mold opening for such parts can be slightly larger than the part to enable it to release easily from the mold.

In the present example, catalyst particles are fabricated such that each such truncated icosahedron has thirty-two essentially planar facets. These facets increase available projected contact area—a strategy in stark contrast to minimizing projected contact area, as in a sphere. The substantial difference in projected contact area complements the relative increase in possible contact events possible with an agitated multitude of such faceted TICO-shaped catalyst objects packed within a reactor.

The resulting numerous frequent contact conditions are observed to produce a relatively increased amount of catalysis for a selected reactant. TICO-shaped supported catalyst carriers of the present example are molded using the process described above in Example 1 and coated according to needs. Many methods exist that are familiar to those skilled in the arts for deposition of materials on substrates that can be used to deposit desired metals, oxides or other catalytic materials on TICO surfaces. The techniques can be selected from varied processes ranging from liquid deposition to vacuum evaporation. In the present example; cobalt metal-coated TICO is used in a Fischer-Tropsch reaction with appropriate synthesis gases in either slurry bubble column reactor (SBCR) or a continuously stirred tank reactor (CSTR). Thermal toughness of the TICO construction of the present example lends itself to such a highly exothermic process.

Prophetic Example 3

Manufacture of a Nine Sided Cylindrical Catalyst Pellet

Figure 8A:
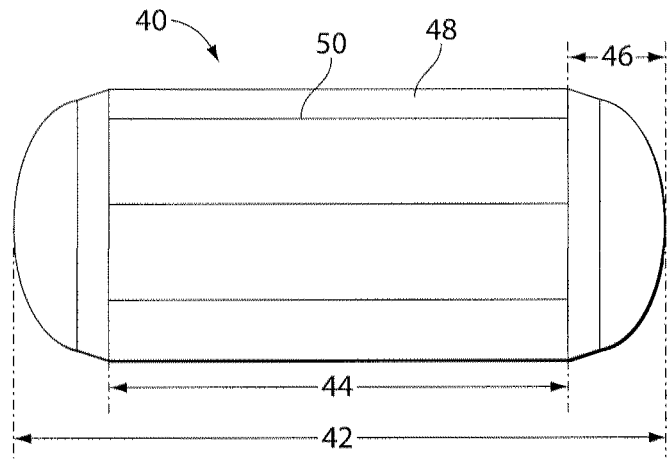
FIGS. 8A and 8B show a nine-sided cylindrically symmetric catalyst substrate pellet according to one embodiment of the invention.
Figure 8B:
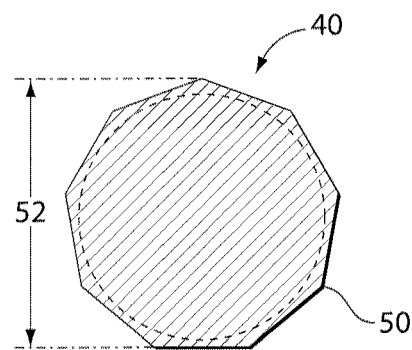

FIG. 8 illustrates another inventive form of a catalytic object and system comprising a catalyst pellet that employs a nine-sided cylindrical shape 40. FIG. 8A illustrates a side view along the length of the cylindrical pellet, while FIG. 8B illustrates a transverse cross-sectional view. The methods described above in Example 1 for CIM molding are used to make this inventive shape. The unusual number and asymmetric arrangement of the essentially planar facets 48 lends itself to good mixing and surface-to-surface contact with minimal locking effects.

In FIG. 8, an illustrative embodiment of the cylindrical pellet is shown. Cylindrical pellet 40 has an overall length 42, with the essentially planar facets having a length 44. A domed end of the pellet has a length 46. The nominal diameter of cylindrical pellet 40 is shown by 52. In this particular example embodiment, the cylindrical pellet is 11.5 mm long, with nine, essentially planar facets each having a length of 7.5 mm. The length of the dome end is 1.95 mm. The diameter 52 of the cylindrical pellet is 5.65 mm. Edges 50 are rounded as described above in Example 2.

Figure 10A:
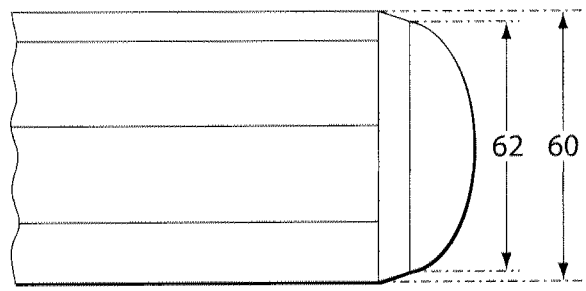
FIGS. 10A and 10B show a dome design for nine-sided cylindrical catalyst pellet ends.
Figure 10B:
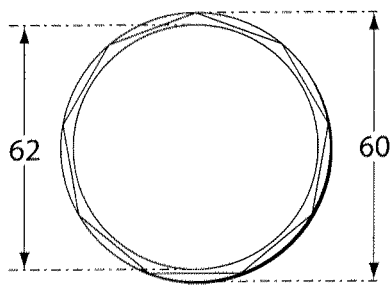

The size illustrated is arbitrary as the concept is broadly applicable to wide range of possible sizes and alternative numbers of facets. The use of other solid materials will also occur to those skilled in the arts. The size of the present example in FIG. 8 has about three times the contacting area of the illustrated and previously described TICO shape having a 3 mm diameter. The larger contact area of a facet of cylinder 40 can be essentially flat and smooth to be fully effective in contact events. The maximum projected contact area of this shape is more than 8 percent of the total external surface area of the particle. This factor for the above-described TICO shape may be typically from just over 2 percent for the smaller facet to just over 3 percent for the larger facet. The FIG. 8 shape may be readily molded using the previously described CIM process or many other possible known molding techniques. The domed ends, as shown in FIG. 10, may minimize attrition of such parts in use such as could occur from simple squared-off end geometry. FIG. 10A illustrates a cross-sectional view along side of the length of the cylindrical pellet, while FIG. 10B illustrates a side view down the length of the cylindrical pellet. The dome design allows for a smooth transition from the domed end to the body of the cylindrical pellet, which comprises essentially planar facets. The diameter 60 is the maximum diameter of the body of the cylindrical pellet, while the diameter 62 of hemispherical dome is relatively smaller, allowing for a smooth transition from the body to the domed end.

Prophetic Example 4

Manufacture of a Hecatohedron Catalyst Pellet

Figure 9:
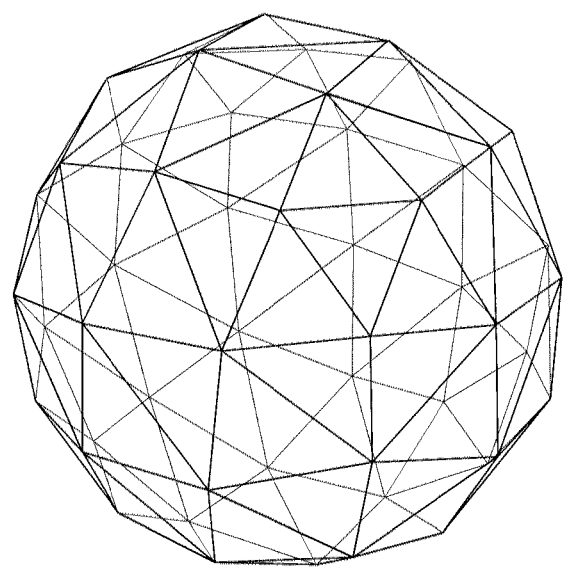
FIG. 9 illustrates a geometric hecatohedron.

The hecatohedron shape of the catalytic object illustrated in FIG. 9 comprises a relatively diametrical symmetry that requires less modification to make the molded object more easily release from a mold cavity. The external surface area of each facet is smaller than the TICO object for a given nominal diameter because the shape approaches more closely that of a sphere. Nonetheless the large number of essentially flat facet surfaces yields projected contact areas considerably larger than with for a spheres of the same diameter. The smaller facets enable the shape to be relatively easily fabricated with a desirable level of flatness and fine surface finish. This "HECA" catalyst shape is readily moldable with the CIM process discussed above. The irregular facet shapes can moderate the locking tendencies of spherical symmetry.

Example 5

Catalytic Enhancement by Surface-to-Surface Contact

In order to observe the contacting effect on the catalytic activity of palladium metal, and alloys thereof, an experimental catalytic anvil-striker contacting apparatus similar to that illustrated in FIG. 12 and described previously was fabricated in the following manner:

Two reed elements were obtained from a reed relay capsule of approximately ¼ inch diameter. A portion of the surface of each reed element was abraded away, and small samples of palladium metal were soldered to the stripped down reed pieces. A 3 mm×3 mm (approximately) palladium sample was soldered to one reed, while a 4 mm×4 mm (approximately) palladium was soldered to the other reed. An external magnetic field was applied to control movement of the reed pieces, so as to bring the palladium samples into contact with each other. Thus, the modified reed elements functioned to provide a simple contact opening means. The modified reeds were set up to be normally closed with a contact force of 6 grams as read by a 0 to 15 grams dial type spring dynamometer used to set relay spring force. The reed pieces were mounted to microscope glass slide as a base using litharge cement. The upper reed was contacted by the lower reed and bent until 6 grams force just opened the contact as determined by an ohmmeter.

The slide assembly was placed in a 1 inch inside diameter Pyrex glass tube for exposure to the reactants (methane gas). The volume of the interior of the tube was approximately 75 ml. The ends of the tube were closed with a single-hole silicone rubber stopper on each end. Methane gas was flowed through the Pyrex tube at a rate of 5 to 10 ml per minute. An external wire coil surrounding the tube was driven by a power amplifier from a function generator to provide the magnetic opening force for the assembly. The palladium contacts on the reeds were brought into contact at a rate of about five times per second, over a time period between several hours to as much as one day. Significant organic deposits were found on the contacts. The longer period showed more deposits. Gas chromatography showed that the molecular weight of the deposits was more than 20,000 in polystyrene equivalent. The palladium used was varied between pure palladium, a palladium-ruthenium alloy comprising 10% ruthenium, and a palladium-silver alloy comprising 10% silver. The deposits appeared thick and tacky.

Working Examples 6-14

Striker/Anvil Catalytic Reactor Test (SAT) Apparatus and its Use to Observe Enhancement of Catalyzed Reactions by Catalyst Object Contact The SAT Apparatus An SAT apparatus as pictured in FIG. 13 and described above was designed to permit evaluation of contact effect with a variety of solid catalyst materials operating in a structure that provides a closed space reaction volume through which carrier and reactant gases may be flowed.

The SAT apparatus incorporates an electronic digitally controlled electro-magnetic driven mechanical system to produce repeated precise contact force between two pieces of catalyst materials (e.g., striker and anvil) in a precisely parallel meeting manner.

Figure 16:
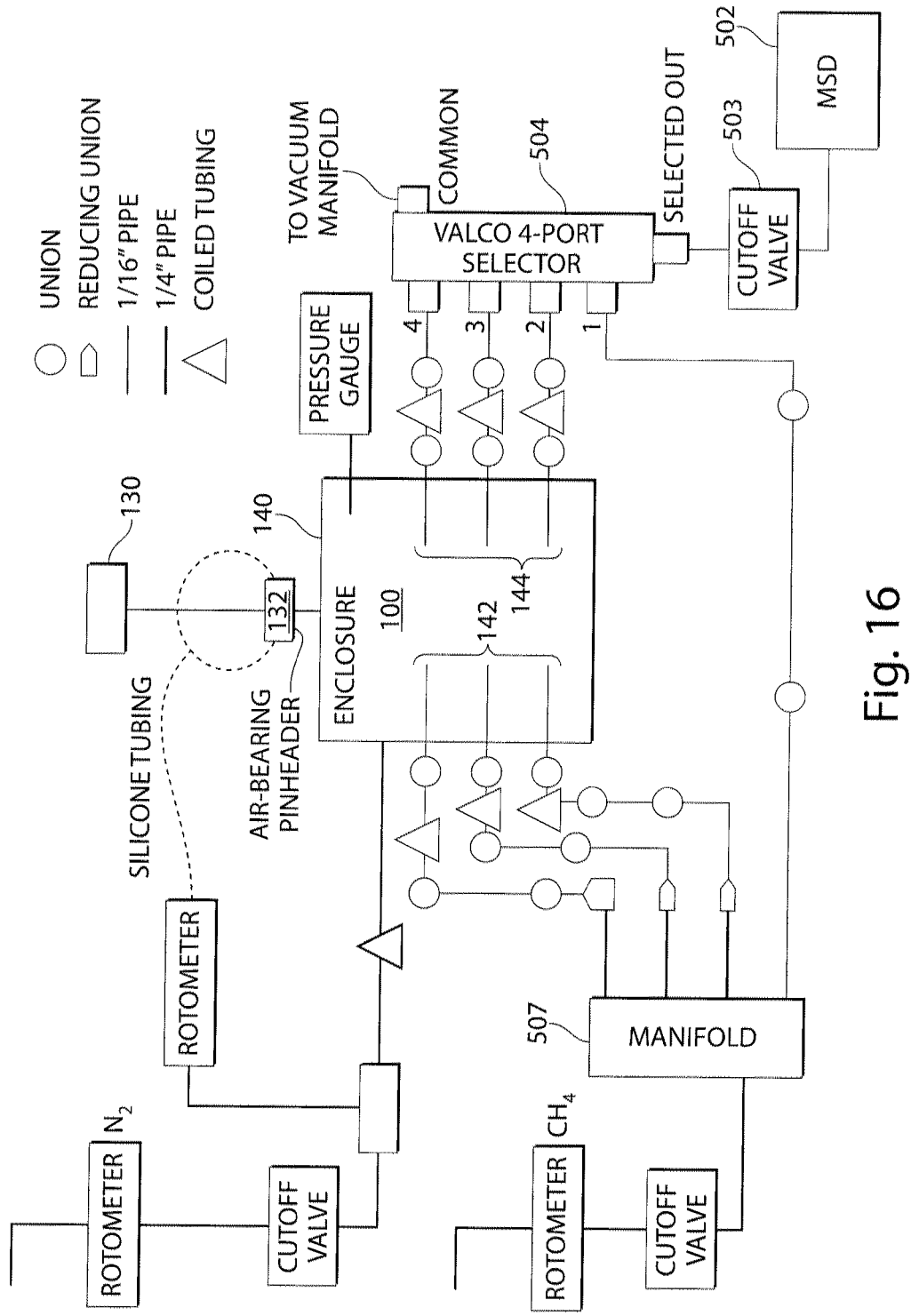
FIG. 16 shows a process flow diagram of a catalytic reactor and analytical system including the anvil/striker catalytic reactor test apparatus of FIG. 13 used for performing Examples 6-15.

A large (30"×60") heavy duty welded steel cart with 8-inch pneumatic tires (not pictured) was used to support the total weight of the SAT apparatus (i.e., more than 700 pounds), as well as a battery back-up power supply (not illustrated), a line-regulator-conditioner (not illustrated), gas flow piping and controls (see, e.g. FIG. 16), a digital-computer controlled electronic digital drive control system (not illustrated), and a computer with 20" LCD monitor (not illustrated). The cart also supports gas flow valves, piping and flow monitoring Rotameters (see FIG. 16). An Agilent Mass Sensitive Detector (Model 5879) 502 is positioned adjacent to the cart and connected to the SAT system 100 via a selector valve 504 and piping within a heated enclosure (not illustrated) attached to the cart. Gas cylinders (not illustrated) supplying the feed gases are connected to the gas control panel 507 on the cart through piping from a cylinder storage area close to the cart The catalyst materials are provided in the SAT apparatus via a removable striker post and a removable anvil carrier insert, such that the catalyst materials may be easily changed. Small pieces of catalyst material are brazed to the replaceable striker post and anvil insert so that the manner in which the two catalyst materials contact one another is constant over various samples. The anvil and striker catalyst materials are ½ mm thick of mill rolled stock fabricated to be flat and parallel to within 30 micro-inches and formed as strips either 3 mm wide or 5 mm wide. The strips have a smooth bright surface finish typically better than 0.5-micron roughness. The 3×3 mm striker and 5×12 mm anvil were cut from the strips with a fine 8/0 jewelers saw and the cut edges filed to remove any "flash."

Figure 14A:
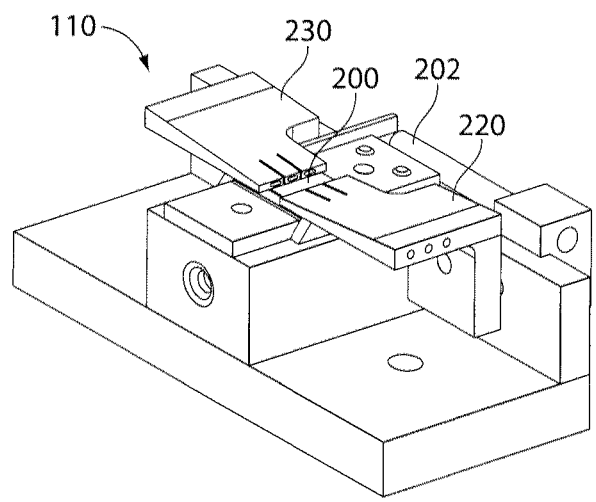
FIGS. 14A-14C show various views of an anvil portion of the anvil/striker catalytic reactor apparatus of FIG. 13.
Figure 14B:
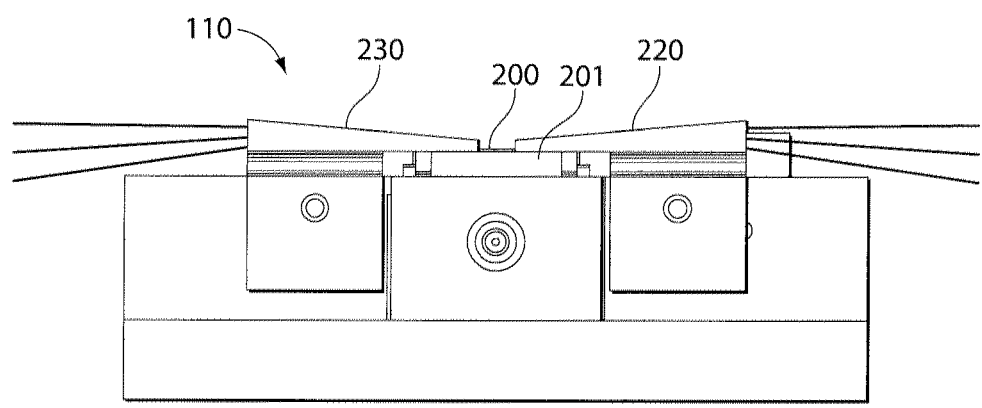
Figure 14C:
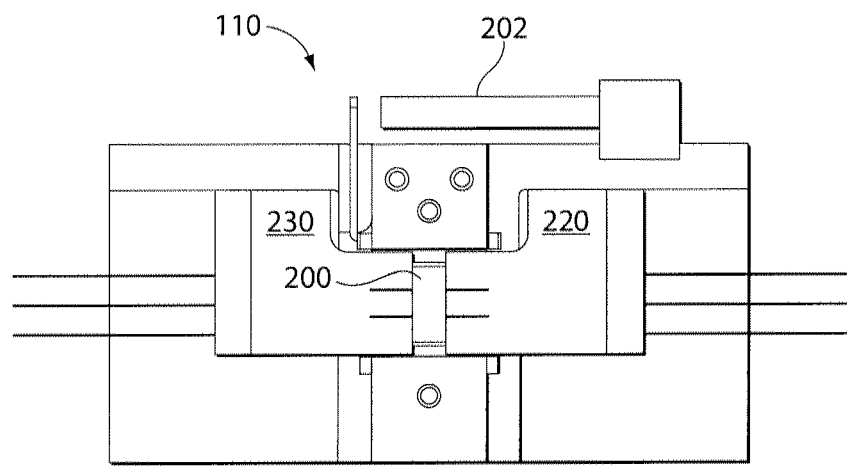
Figure 14D:
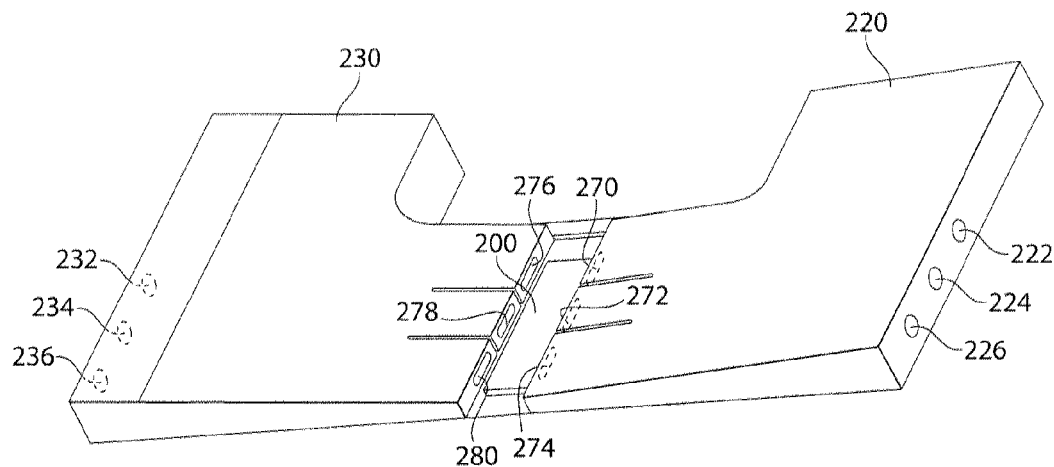
FIGS. 14D-14E show close-up views of the anvil apparatus of FIGS. 14A-14C.
Figure 14E:
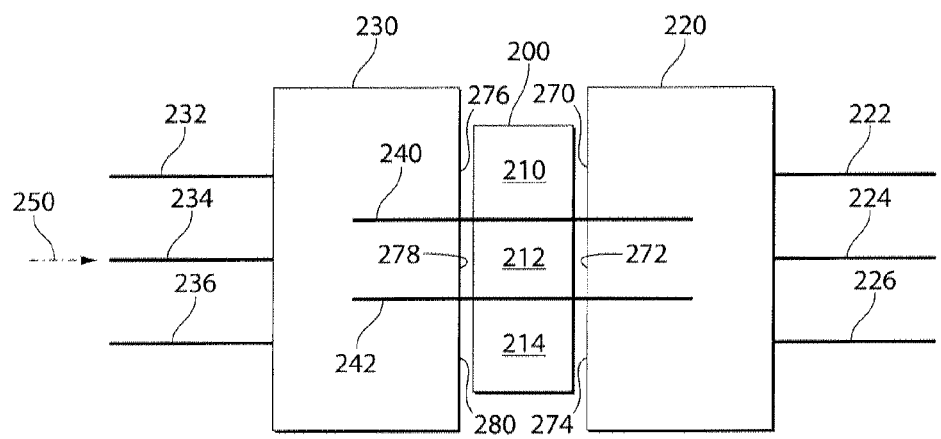
Figure 14F:
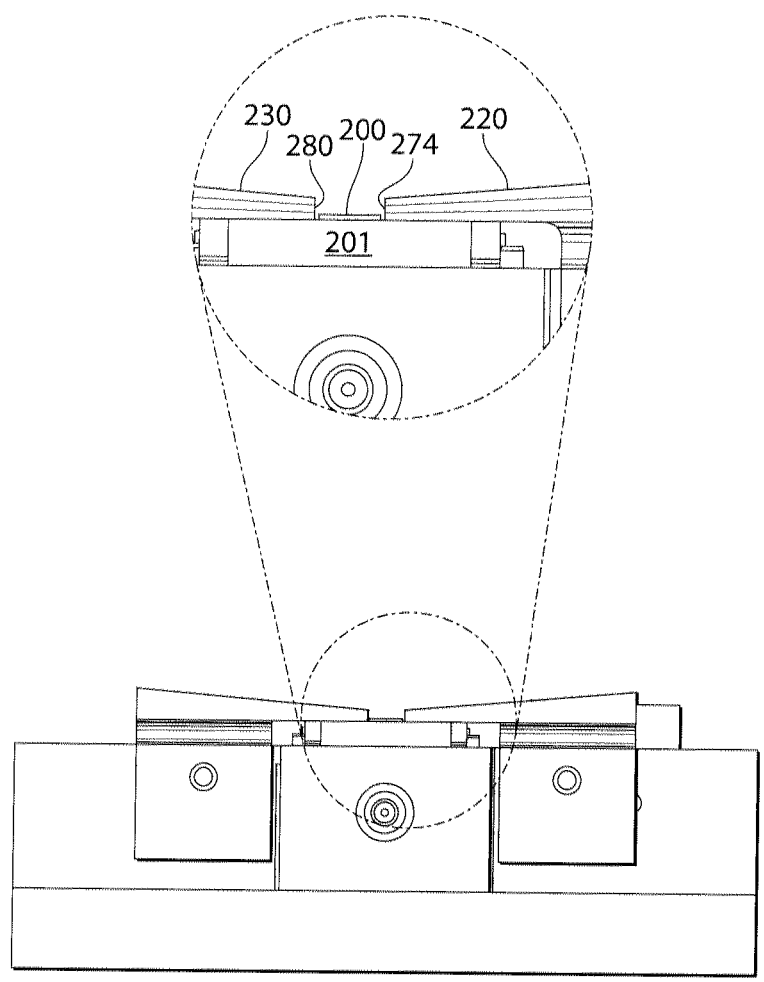
Figure 14G:
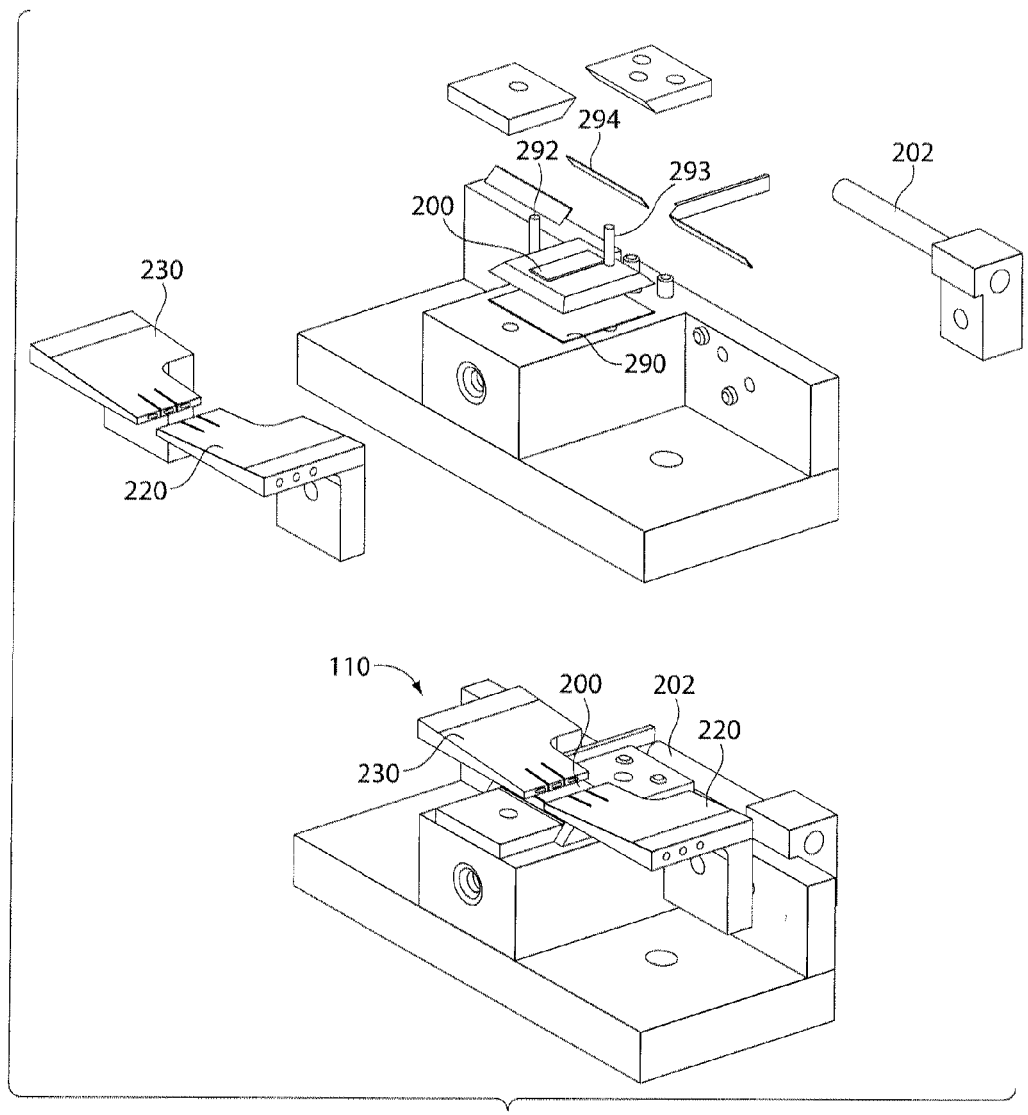

FIGS. 14A-G show various views of anvil assembly 110 of SAT 100. Anvil 200, which is brazed to anvil insert 201 (FIG. 14B), is positioned between inlet port 230 and outlet port 220 such that, when reactant gas is fed from inlet port 230 to outlet port 220, the reactant gas flows across the width of anvil 200 and contacts anvil 200. FIG. 14D show a close-up view of inlet port 230 and outlet port 220. Inlet port 230 comprises inlets 232, 234, and 236, through which reactant material may be introduced. Inlet port 230 further comprise nozzles 276, 278 and 280, which introduce the reactant material to the surface of anvil 200. Nozzles 276, 278 and 280 are arranged such that the nozzle openings are positioned just above the surface of anvil 200 and about ½ mm from the edge of anvil 200. Nozzles 276, 278 and 280 are angled downward about 3 degrees from parallel with the plane of the anvil surface to ensure that the reactant gas contacts anvil 200. Nozzles 276, 278 and 280 are shaped (e.g., substantially rectangularly shaped) such that, when the reactant gas is introduced to anvil 200, the reactant gas has laminar flow. The bottom edges of nozzles 276, 278 and 280 are precisely located ¼ mm above the top surface of the anvil insert 201. Similarly, outlet port 220 comprises complementary nozzles 270, 272 and 274, through which the reactant/product gas can exit after contacting anvil 200. Nozzles 270, 272 and 274 are also arranged such that the nozzle openings are positioned just above the surface of anvil 200 and about ½ mm from the edge of anvil 200, and the bottom edges of nozzles 270, 272 and 274 are precisely located ¼ mm above the top surface of the anvil insert 201. Outlets 222, 224 and 226 are connected to gas outlets 144 (see FIG. 13) to evacuate the reactant/product gas from the SAT apparatus 100 and to feed the streams to the Mass Spectrometer analysis system (Agilent 5879 MSD). Resistor 202 (e.g., a 1000 mW resistor) eliminates static charge. Ceramic components 290 and 294 insulate the anvil 200 from current, and dowels 292 and 293 guide the positioning of anvil 200 (FIG. 14G).

A particularly advantageous feature of the SAT apparatus allows various portions of anvil 200 to be studied simultaneously. FIG. 14E shows a top view of a portion of anvil assembly 110, wherein dividers or "fences" 240 and 242 are positioned across the width of and in contact with anvil 200 to define portions 210, 212 and 214 of anvil 200, and to prevent crossover of reactant/product gas from one portion to another portion during operation. Dividers 240 and 242 may be held in place, for example, by slots or grooves in inlet port 230 and outlet port 220. In some cases, the dividers 240 and 242 may be made of glass, or any other material which may physically isolate portions 210, 212 and 214 from one another. In the present example embodiment, thin Borosilicate (6 mil thick) glass "fences" that are 5.5 mm high and 18.3 mm long were used. Reactant gas was introduced in a direction 250 via inlets 232, 234 and 236, such that reactant gas exiting outlet 276 only contacts portion 210 of anvil 200, reactant gas exiting outlet 278 only contacts portion 212 of anvil 200, and reactant gas exiting outlet 280 contacts only portion 214 of anvil 200. This arrangement may be advantageous in that the different portions of anvil 200 may be comparatively evaluated under the same reactant conditions to determine the relative enhancement in catalytic activity portion 212 when contacted by a second catalytic material.

In some cases, the dividers 240 and 242 are not necessary, as the laminar flow of reactant gas can be controlled, for example, by controlling inlet and outlet flow rates, such that there is substantially no crossover of reactant gas from one portion to another.

In this example, reactant gas flowed in a direction 250 from inlet port 230 to outlet port 220. It should be understood that, in other embodiments, reactant gas may flow in a direction opposite to direction 250 (e.g., from port 220 to port 230).

Anvil 200 was configured to have a larger surface area (5×12 mm) than the second catalytic surface (i.e. the catalytic surface of striker 300 (3×3 mm) and was arranged such that the striker contacted only portion 212 of the anvil 200 during operation. In other words, portion 212 of anvil 200 was contacted by a second catalytic surface (i.e., the striker 300) in the presence of reactant gas, while portions 210 and 214 of anvil 200 were not placed in contact with a second catalytic surface in the presence of the same reactant gas. Portions 210, 212 and 214 were then separated evaluated for the catalytic activity that occurred at each individual portion. Anvil assembly 110 thus possesses an arrangement and geometry that provides for differential comparison of the "struck" (e.g., portion 212) and "unstruck" (e.g., portions 210, 214) areas of anvil 200 while exposing all areas essentially identical conditions. Differences in catalytic activity between "struck" and "unstruck" areas of anvil 200 may then, with allowance for the clearance times of reactant/product in the piping runs and suitable correction for any differences in total catalyst surface are owing to the intermittent presence of the additional area of the striker in zone 212, be attributed solely to the contacting effects of, for example, the striker on the anvil.

Figure 15A:
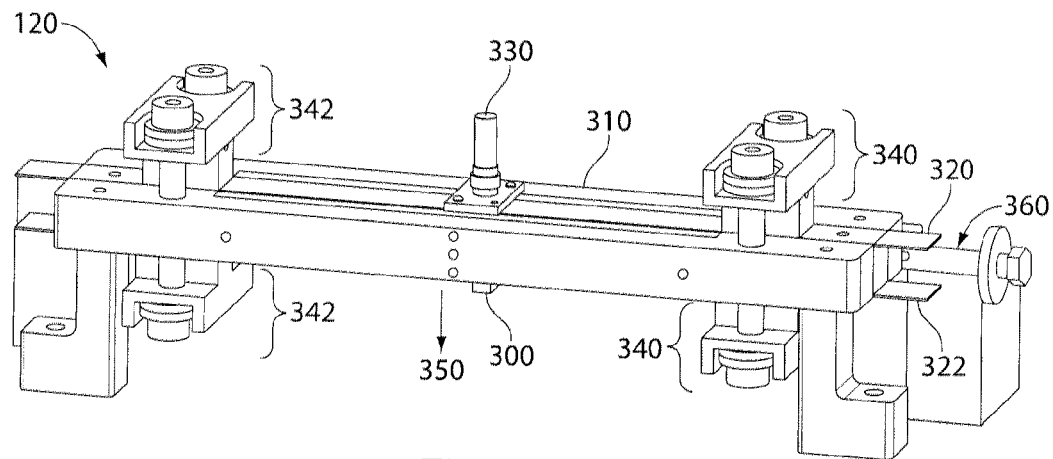
FIGS. 15A-15B show views of a striker and striker suspension portion of the anvil/striker catalytic reactor test apparatus of FIG. 13.
Figure 15B:
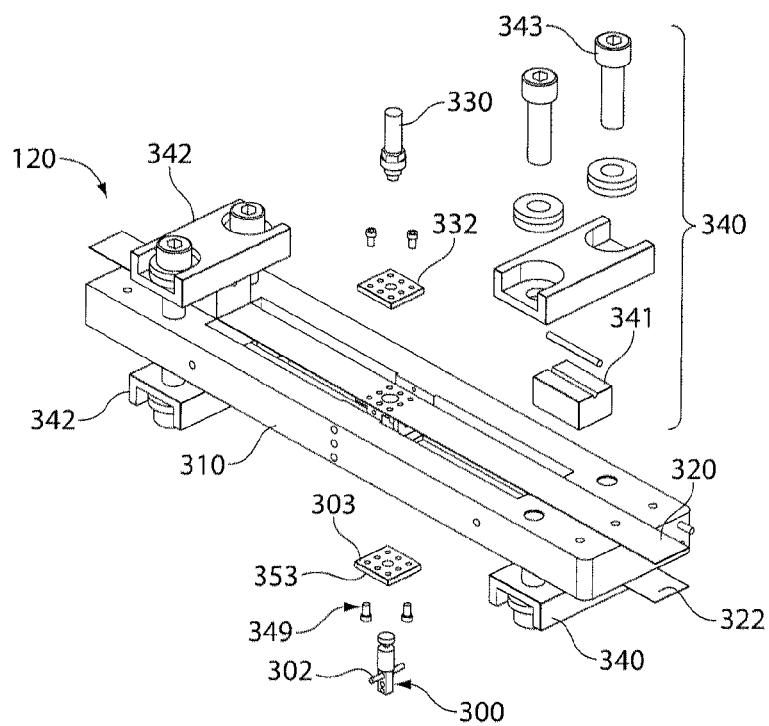
Figure 15C:
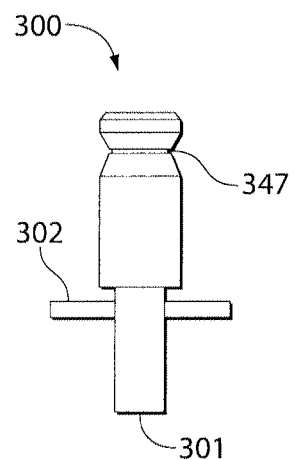

FIGS. 15A-C show various views of striker assembly 120, which is positioned directly over anvil assembly 110 in SAT apparatus 100.

As shown in FIG. 15A, striker post 300 is connected to an assembly comprising foil suspension strips 320 and 322, foil frame 310, and connector rod 330. Connector rod 330 is further connected to actuator 130, as shown in FIG. 13, which controls movement of striker post 300 via the actuating foil mechanism, wherein foil strips 320 and 322 oscillate as directed by actuator 130. Foil frame 310 is 18 mm thick and is precisely ground flat and parallel to allow proper clamping of foil suspension strips 320 and 322. Foil suspension strips 320 and 322 and foil frame 310 are made of X-750 material, and each have a different thickness to ensure that their resonant frequencies differ significantly. For example, foil suspension strip 322 is 0.001" thick and foil suspension strip 320 is 0.002" thick. Clamp assembly 340 and 342 are constructed to have smooth surfaces in order to uniformly distribute force across foil suspension strips 320 and 322 and to solidly anchor foil suspension strips 320 and 322, which are tensioned in a setup fixture to 11 grams force. Spacer 341 is finished to have a smooth surface such that it contacts foil strip 320 uniformly, and screws 343 are self-leveling. Actuator 130 directs oscillation of foil suspension strips 320 and 322 via connector rod 330 such that striker post 300 moves in a direction 350 toward the anvil 200. Foil frame 310 may be moved vertically via rotational mount 360.

FIG. 15C shows a close-up view of striker post 300 and striker 301, which was attached via brazing to a bottom surface of striker post 300 such that striker 301 can contact anvil 200. The striker post 300 and the anvil insert 201 were fabricated of a 316L stainless steel, providing very flat and smooth surfaces to which the catalyst material was brazed. The mating surfaces of these carrier parts were tinned in a like manner, removing any excess solder with solder-wick. The catalyst pieces (i.e., anvil 200, striker 301) were then easily fused to the carrier parts with a minimal amount of solder, by fusing the two pre-tinned parts in the presence of a very small amount of a rosin flux. The 316L parts were tinned with 221C tin-silver solder using a hydrochloric acid-based flux sold by Lucas-Milhaupt for stainless steel work (Handy Flux Type TEC). A thin (0.003" thick) ribbon of this SnAg eutectic alloy solder was provided by Lucas-Milhaupt. These tinning and fusing operations were carried out using an electrical temperature controlled laboratory hot-plate. The fluxes used were thoroughly removed after each soldering operation and followed with a pure water wash and acetone rinse before use.

As described above, striker 301 is a small plate of catalytic material (e.g. a 3×3 mm plate of Pd in this example) attached to a bottom surface of striker post 300, such that striker 301 contacts anvil 200 when striker post 300 is lowered in the direction 350 (FIG. 15A). The removable striker post 300 is fabricated from 316L material, is 0.250" diameter and has a precisely placed notch 347 near the top end which engages two spring loaded ball dent screws 349 that position striker post 300 within the striker assembly 120. As shown in FIGS. 15B-C, striker post 300 also comprises a ¹⁄₁₆" dowel pin 302 and is drawn against a V-groove 353 in the bottom of foil clamp plate 303 to maintain proper alignment of striker 301.

In the example embodiment, the striker 301 contacts the anvil 200 only at portion 212 of the anvil 200, and does not contact portions 210 or 214 of anvil 200. As shown in the experimental runs described more fully below, the portion of anvil 200 which is contacted by striker 300 (i.e., portion 212), in the presence of reactant gas, exhibited enhanced catalytic activity relative to portions 210 and 214. In some cases, catalytic activity may be increased by over 50%, over 75% or over 90%, relative to the unstruck portions 210 and 214.

The catalyst materials were attached to striker post 300 and anvil insert 201 by a special brazing technique employing a eutectic solder. Eutectic solders have a specific temperature at which they melt and immediately become fluid (i.e., they do not display a softening range as they are heated). This property allows the brazing of a flat catalyst material to a flat carrier metal such that the capillary action of the fluid solder ensures precise parallel mating of the surfaces. A variety of alloys exist within a workable temperature range. In some cases, a particular proportion of gold and silicon can be eutectic at a relatively high temperature. The alloy selected for experiments described herein was pure tin with 3.5% silver, which melts at precisely 221° C. The catalyst material strips were tinned only on the mating side with this eutectic solder. After tinning, the tinned layer of the solder was minimized by scavenging the tinned surface with "solder-wick," which is a very fine copper braid about 3 mm wide, coated with a "rosin" type solder flux. The scavenging of the solder was carried to the point where the solder film is bright, smooth, thin and shows no small lumps or high points. After tinning, the striker 301 was attached to striker post 300 and the anvil 200 was attached to anvil insert 201 via brazing.

A four-port Valco (VICI) selector valve 504, was used to sample, sequentially each of the three anvil areas and the input gas stream from portions 210, 212, and 214. This type of selector valve vents the non-selected, un-sampled ports to a vacuum dump line thereby maintaining flow through the sampled port and unselected lines keeping the flow current for when a sample is selected.

Inlet port 230 and outlet port 220 were connected to their corresponding feed or Valco ports through 1/16 inch 316L Stainless Steel tubing commonly used in chromatography equipment and sold by Valco as T100C40 as cleaned internally electro-polished and sealed in one meter lengths. These tubes were bent by hand to shape them to position so that each set of three rear openings that connect a nozzle block firmly seat each tube into its shouldered 1/16 inch opening thereby smoothly connecting the 0.040" (1 mm) internal tube diameter to the nozzle path. Each nozzle was wire EDM machined into the nozzle block 230, 220 providing a smooth laminar flow transition from the round 1 mm ID to the 1.0×3.1 mm wide nozzle slot. Lateral movement of the EDM wire was used to shape the smooth transition from round to the broad nozzle aperture.

The use of EDM machining (e.g., machining of high Nickel alloy materials) often produces residual products due to the spark erosion of the metal, leaving a "white layer". Such "white layers" may form when typical cleaning operations are performed or aggressive chemistries are used, which may cause the apparatus to malfunction. In order for mechanical and chemical tolerance to be preserved, precision surfaces should be brought to size in bright metal cleanliness. Accordingly, many components of the SAT system 100 were manufactured from a single one-inch thick plate of X-750 High Nickel alloy material, which is chemically resistant. The Ni alloy was annealed in vacuum at 1800° F. and quenched slowly in argon to develop desired properties for this application. X-750 is prone to work harden during machining, especially due to precipitation hardening within a 1000 to 1300° F. temperature range. Thus, cutting speeds and feeds were carefully managed to avoid work hardening. Cobalt cutters at moderate cutting speed were used. After substantial machining of pre-annealed material a subsequent anneal cycle was performed to preserve properties and provide stability. In some cases, two or three anneal cycles are preferred. In some cases, X-750 High Nickel alloy material is fully annealed before beginning any machining operations, and the "white layer" of the mill product is removed to a depth of 0.015-0.025 inches.

The SAT enclosure 140 was heated in a controlled manner by five cartridge heaters (not pictured) embedded in a 3/4 inch thick Aluminum Heat Transfer Plate (not illustrated) intimately attached by twelve 1/4-20 18-8 Stainless Steel screws (not illustrated) to the bottom of the base 141 of enclosure 140. This enabled tests to be conducted at elevated temperatures up to 200° C. or higher in some cases. Both mating faces of these two parts were surface-ground flat to better than 3/10,000 inch flatness with surface finish roughness less than 50 micro-inch. The surfaces were very thinly coated before assembly with a finely powdered Boron Nitride lubricant sold by Omega engineering as HTRC compound. The two parts were repeatedly slid against each other moving an inch or so to evenly distribute the compound to insure that all of the surface is wetted with the compound by reducing the sliding stroke gradually to just a millimeter or so. The 1/4-20 screws were Pan headed with thin stainless washers and stainless Bellville spring washers to allow for thermal expansion while maintaining the desired clamping force. They were seated in counter-bored recesses (0.585" D) in the bottom of the Heat Transfer Plate and the clearance hole for the 1/4-20 screws were over sized at 0.280".

Several thermocouples (not pictured) provide readout of the temperature of the anvil during operation. These and other thermocouples were used as sensors to control a PID temperature controller (not pictured) that powered five 1/4-inch diameter 250 Watt cartridge heaters (not pictured) (available from Omega Engineering as CIR-1042/120V) embedded evenly across the mid-line of the Heat Transfer Plate. These cartridges were also coated with the HTRC thermal compound to fully couple the heat to the plate. The mounting holes for the 1/4 inch diameter heaters provides 10 to 12 thousandth inch clearance before the compound is applied as the heaters are inserted. The PID controller operates a "zero-switching" solid-state relay that minimizes electrical noise production that might interfere with the electronic control system and data logging computer (not pictured) that are part of the overall SAT system. To provide compressive stability and low heat transfer to the aluminum main base plate, a 3 3/16 inch thick block of closed-cell glass foam (trade name "Foamglas" from Dow Corning) material (not pictured) was cut from larger pieces and was laminated top and bottom with a 1/32 inch thick aluminum sheet metal to avoid crumbling the material. The laminating was performed using a Dow Corning 736 High Temperature RTV Silicone sealant using a thin layer to adhere the metal to the glass foam. The length at 14 5/8" was slightly less than the enclosure base length and the width was 5 5/16", allowing clearance for the heat transfer plate locating and positioning brackets. The SAT enclosure 140 thus was mounted to the cart so that it was separated from the cart by the Foamglas block.

Figure 17A:
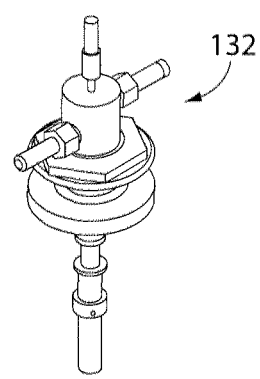
Figure 17B:
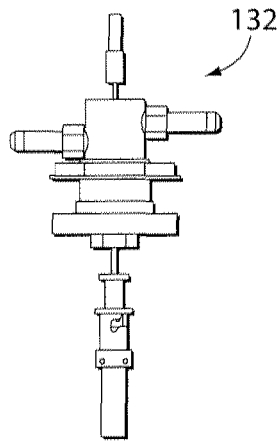
Figure 17C:
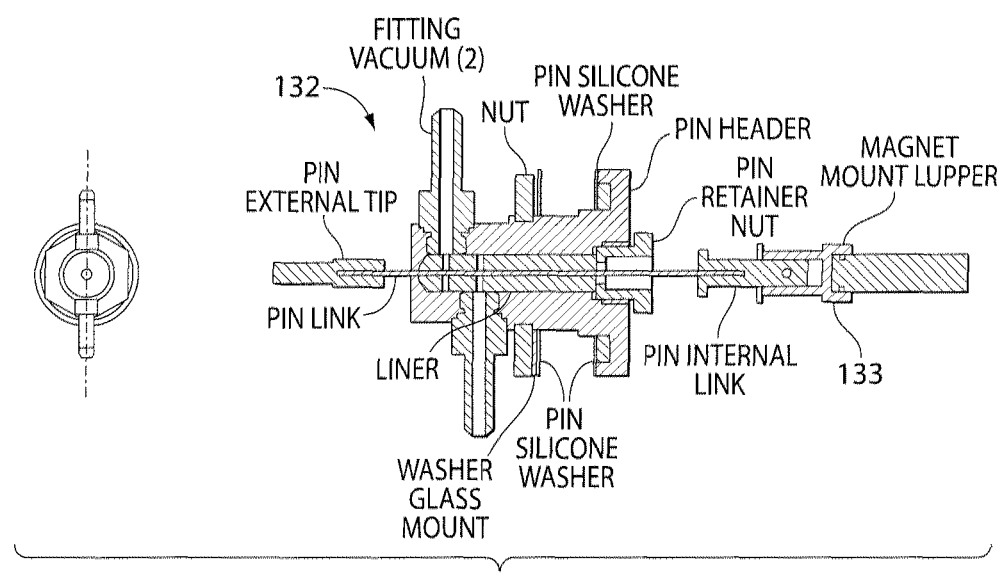

Enclosure 140 is designed to contain a moderately pressurized gaseous atmosphere, some of which flows over the contacting catalyst materials. The enclosure 140 has the dimensions, 18"×5.5"×7.5", with a one-inch thick metal base 141 and a welded metal frame 143 supporting five sides that form an enclosed volume of about 8.5 liters. The frame and base were fabricated from X-750 material and all the fully annealed parts were welded together using type 80 filler rod and subsequently annealed again before finish machining. Each frame end is formed of one inch thick 5.5" by 7.5" X-750 material. The ends are each closed by a ½-inch thick metal bulkhead flat ground plate 145, 147, of 316L material that has penetrations for the input gases and the thermocouple sensors. Both of these bulkhead plates are secured with 6 mm stainless DIN cap screws and self leveling spherical washers (JERGENS stainless self aligning washers) threaded to the tapped holes in the enclosure frame ends. Viton O-rings of ⅛-inch nominal diameter material in a groove in each bulkhead plate seal them to provide leak free operation. The top and the two sides employ thick (e.g., 9 mm) borosilicate plate glass windows 149 (Schott Glass) that form a pressure sealed enclosure, using similar Viton O-rings to seal the sides. These O-rings were fabricated by vulcanizing to size by a commercial vendor using a reference plate with all the required three different rectangular grooves milled into this plate as a check on the proper dimensioning. The front glass window is removable. The top of enclosure 140 also employs a borosilicate glass window and has a hole 151 located directly above the Alnico 8 magnet 330 attached to the top of the striker carrier upper foil clamp plate 332. A PIN link air-bearing assembly 132, the structure of which is shown in greater detail in FIGS. 17A-C, is installed with sealing O-rings and silicone rubber gaskets so that the 0.030" diameter 316L wire link rod 131 is freely moved by an electromagnetic drive system 130 positioned directly above it.

The electromagnetic drive system 130 is mounted on a ½ inch thick Boom plate (not pictured) (VPN) mounted vertically on a Mast (VRT) (not pictured) made from an aluminum heavy-weight 6" wide channel that is solidly anchored by bolts to a mating thick mounting block (not pictured), also securely bolted to a 30-inch square ¾ inch thick aluminum horizontal main base plate (not pictured). This main mechanical base rests on several inflated bicycle tires (not pictured) forming an effective isolation of low-level vibration from the cart equipment or building structure-borne sources, reducing undefined and uncontrolled levels of vibrating variation of contact force between the striker and the anvil.

SAT General Test Protocol

As described above, the SAT system is composed of six basic sub-systems.
1) gas sources and regulators,
2) valves and gas flow controls,
3) SAT test enclosure,
4) Valco selector valve,
5) Agilent 5879 Mass Selective Detector
6) Data logging computer and striker drive control electronics A test run begins with the front window of the enclosure 140 opened. The bayonet connected internal magnet link 133 to the PIN header 132 is removed to allow the foil frame 310 to be rotated upward via rotational mount 360 exposing the striker post 301 so that it may be removed and replaced by a desired striker/catalyst post and the corresponding anvil insert 201 with its catalyst material similarly removed and replaced with one desired for the test run. These parts were prepared prior to setting up a test run.

After installing the desired striker 301 and anvil 200, the next step was to begin a break-in run of the new striker and anvil. A break-in run was started by first selecting the number of strokes to be taken by striker post 300. Typically, 3000 strokes were used with the system normally operating at 3 strokes per second. After the break-in run, the anvil insert 201 and striker post 200 were examined in the SEM with photo data taken and an EDAX analysis taken. The insert and post were returned to the SAT enclosure and the front glass side of the enclosure 140 was reinstalled.

The gas flow conditions were then established for the test. For the palladium catalyst material runs, zero grade pure nitrogen carrier gas was used at a flow rate of 2.5 liters per minute into the main port of the enclosure 140. Methane reactant gas was fed to the inlets 142 at a rate of one liter per minute. Prior to beginning the test gas run, the chamber and nozzles were fed pure helium gas for 20 minutes to clear all lines. The shutoff valve 503 between the output of the Valco selector valve 504 and MSD 502 was kept closed until pressure indicated on the output of the enclosure 140 read stable at more than 1.5 psi. During this period of initial gas flow into the enclosure the MSD's internal calibration spectrum test was run using the test substance injector built in to the MSD 502. After completion of this test, MSD 502 is allowed to pump down and, when stable, the shutoff valve is opened and the test run was begun. Throughout the test run, the performance of MSD 502 and temperature conditions were logged by the system computer. After stable gas flow is established, the temperature adjustment program was started for set points desired for the temperature of the test operation.

Test runs were conducted at various temperature levels and over varied time periods as described more fully below. The test runs were performed at 3 strokes per second with a strike force of about 12 g. After each run, the striker 301 and anvil 200 were again examined by SEM and EDAX for mechanical changes or other surface effects. Typically, no alterations were found.

As shown in the results data described below, generally, substantial increases in catalyzed product abundance were observed in samples taken from the contacted area of anvil 200 (e.g., portion 212) relative to the two un-contacted areas of anvil 200 (e.g., portions 210 and 214). The Valco selector valve 504 was used to sample sequentially product gas from portions 210, 212, and 214 of anvil 200, as well as the input gas stream for portions 210, 212, and 214. For example, portion 210 was sampled first, portion 212 was sampled second, and portion 214 was sampled third. In some cases, "unstruck" portion 214 was sampled too quickly after "struck" portion 212, and carryover material (e.g., excess product) was observed for "unstruck" portion 214. This anomaly was confirmed by reversing the rotation of selector valve 504, such that portion 214 was sampled first, portion 212 was sampled second, and portion 210 was sampled third. As expected, when "unstruck" portion 210 was sampled too quickly after "struck" portion 212, carryover material (e.g., excess product) was observed for "unstruck" portion 210. When a longer period of time was allowed for clearing lines between each sampling, the carry over effects were largely reduced. The catalytic enhancement effects far exceeded carryover effects.

Test Example 6

Use of SAT Apparatus for Pd-catalyzed Synthesis of Hydrocarbons from Methane Gas at 70° C.

The SAT apparatus described above was fitted with a 5"×12" Pd anvil and a 3"×3" Pd striker and the test run was performed generally as described above. In this example, the SAT apparatus was heated to 70° C., and methane gas was fed into inlets 142 at a rate of one liter per minute. During the test run, the striker contacted the anvil at a rate of 3 strokes per second with a strike force of about 12 g. Samples of the reactant gas from the "struck" portion and the "unstruck" portions of the anvil were fed into the mass spectrometer over various periods of time to measure levels of product produced during the test run.

Figure 18A:
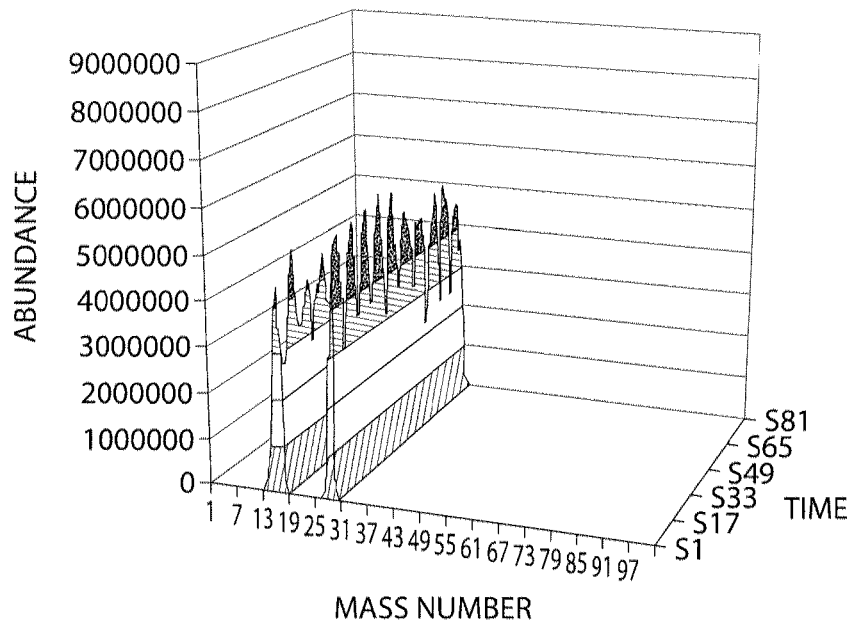
FIG. 18 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, at 70° C.
Figure 18B:
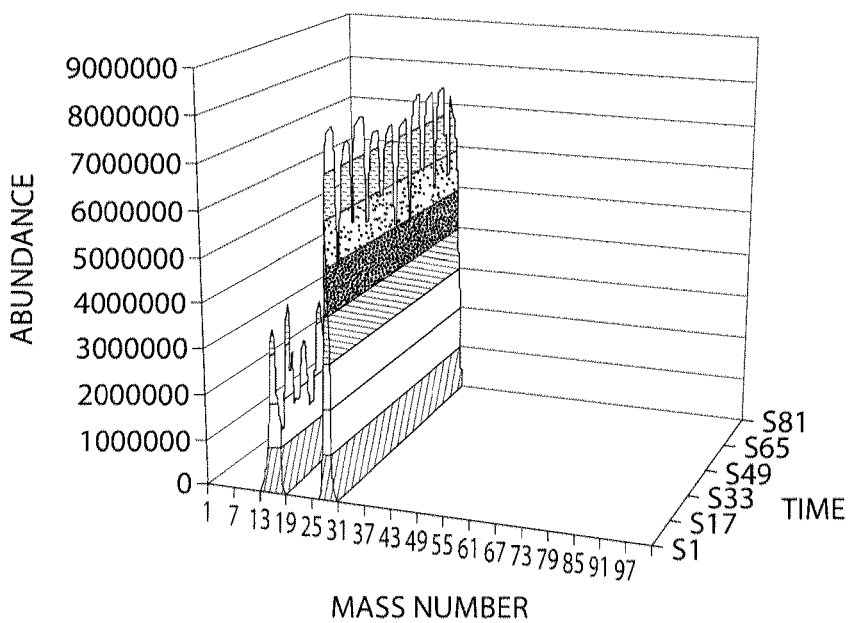

FIG. 18A shows the mass numbers (x axis) and abundance (y axis) of species in the reactant gas for an "unstruck" portion of the anvil, sampled at various times (z axis) during the test run. The peaks having a mass number of about 14 correspond to the methane starting material, while the peaks at about 30 mass number correspond to a higher hydrocarbon product. FIG. 18B shows the mass numbers (x axis) and abundance of species (y axis) in the product gas for the "struck" portion of the anvil, sampled at various times (z axis) during the test run. Comparing FIGS. 18A with 18B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane at this temperature.

Test Example 7

Use of SAT Apparatus for Pd-catalyzed Synthesis of Hydrocarbons from Methane Gas at 150° C.

This test run was conducted as described in Test Example 6, except that the SAT apparatus was heated to 150° C. during the test run.

Figure 19A:
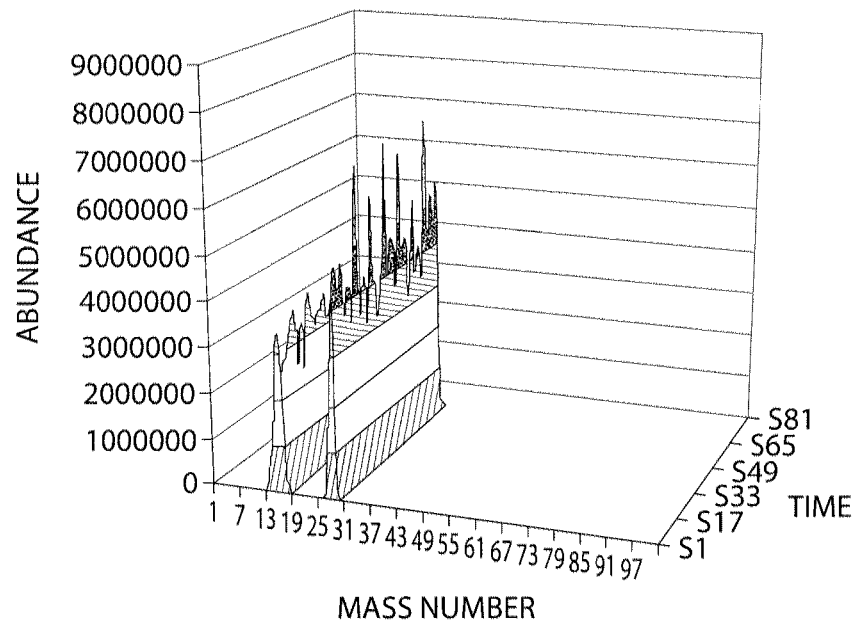
FIG. 19 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, at 150° C.
Figure 19B:
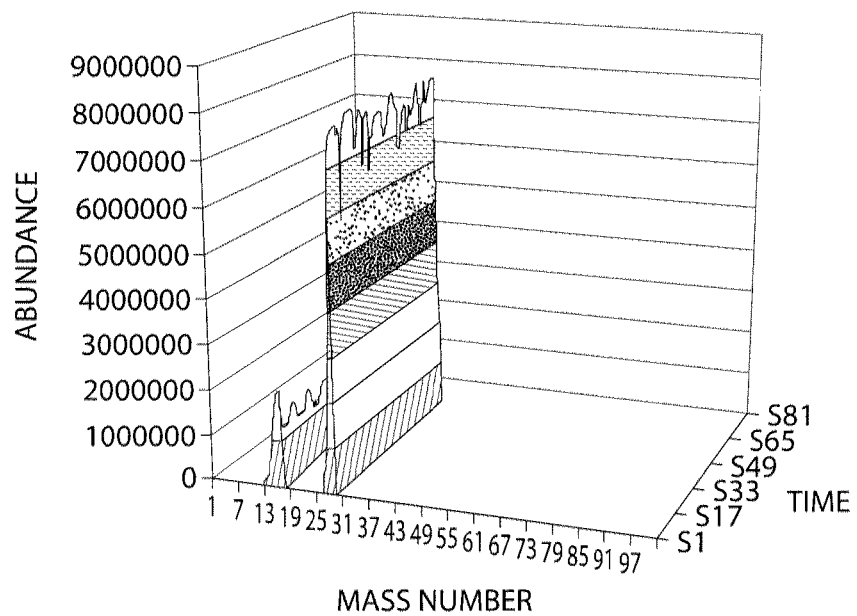

FIG. 19A shows the mass numbers (x axis) and abundance (y axis) of species in the reactant gas for an "unstruck" portion of the anvil, sampled at various times (z axis) during the test run. FIG. 19B shows the mass numbers (x axis) and abundance of species (y axis) in the product gas for the "struck" portion of the anvil, sampled at various times (z axis) during the test run. Comparing FIGS. 19A with 19B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane at this temperature.

Test Example 8

Use of SAT Apparatus for Pd-catalyzed Synthesis of Hydrocarbons from Methane Gas from 71° C. to 31° C.

This test run was conducted as described in Test Example 6, except that the test run began with the SAT apparatus heated to 71° C., and the temperature was lowered to 31° C. over the course of the test run.

Figure 20A:
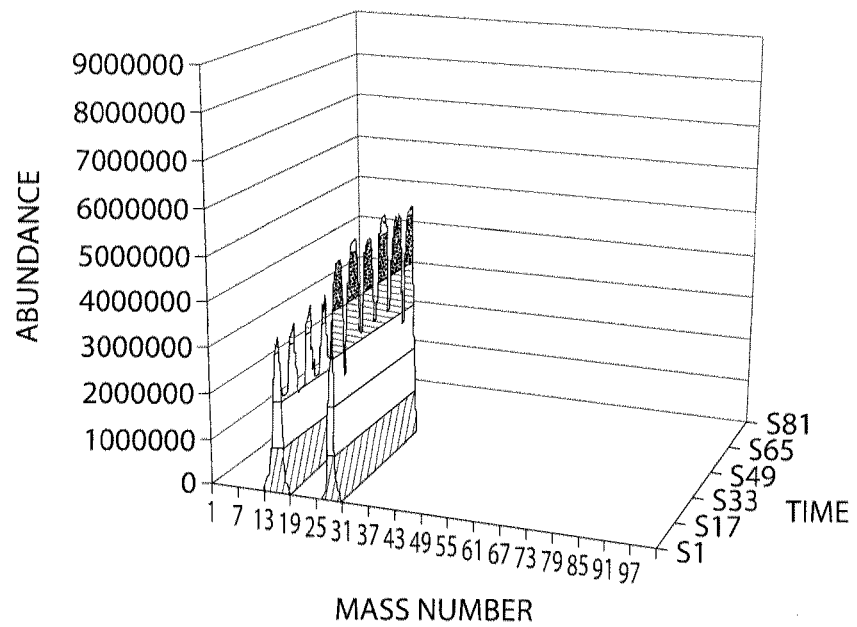
FIG. 20 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is lowered from 71° C. to 31° C.
Figure 20B:
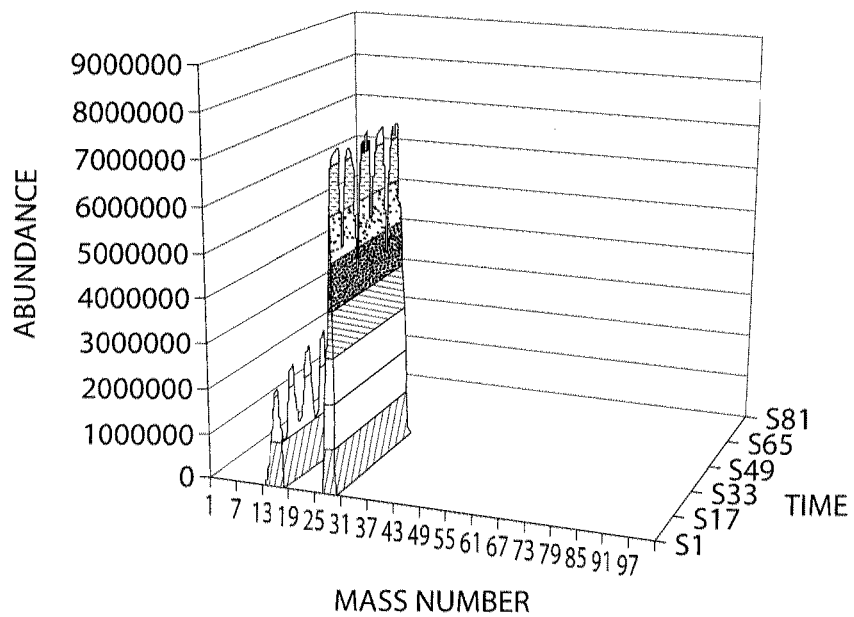

FIG. 20A shows the mass numbers (x axis) and abundance (y axis) of species in the reactant gas for an "unstruck" portion of the anvil, sampled at various times (z axis) during the test run. FIG. 20B shows the mass numbers (x axis) and abundance of species (y axis) in the product gas for the "struck" portion of the anvil, sampled at various times (z axis) during the test run. Comparing FIGS. 20A with 20B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

Test Example 9

Use of SAT Apparatus for Pd-catalyzed Synthesis of Hydrocarbons from Methane Gas from 60° C. to 80° C.

This test run was conducted as described in Test Example 6, except that the test run began with the SAT apparatus heated to 60° C., and the temperature was raised to 80° C. over the course of the test run.

Figure 21A:
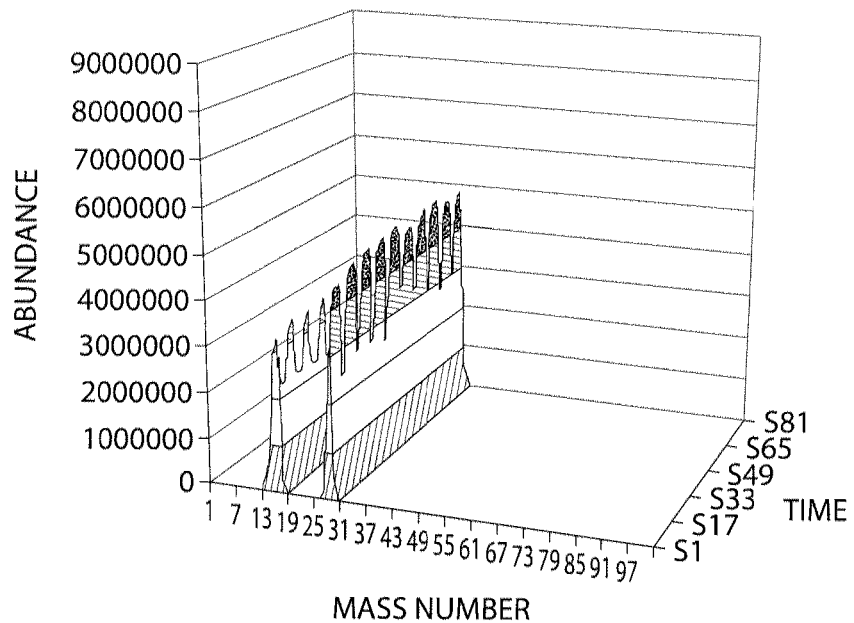
FIG. 21 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is raised from 60° C. to 80° C.
Figure 21B:
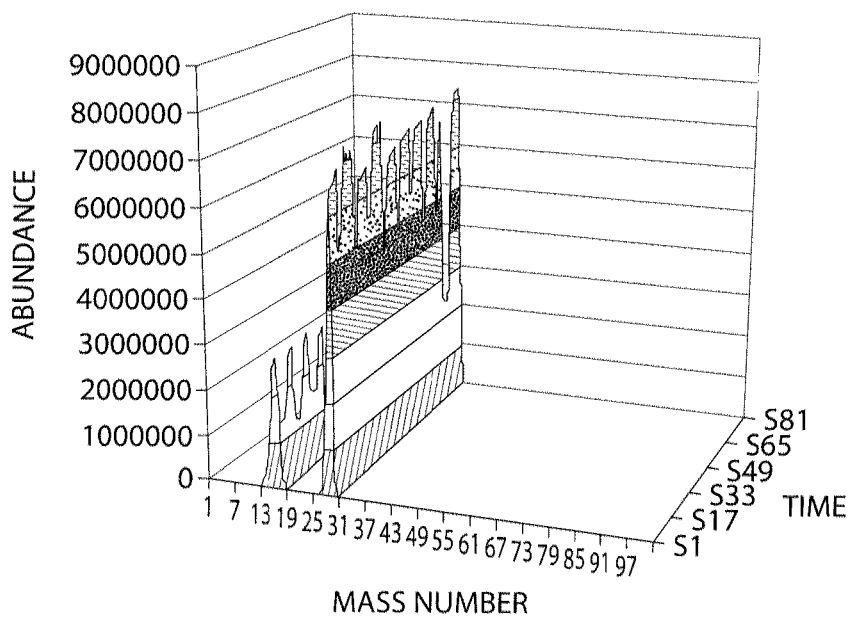

FIG. 21A shows the mass numbers (x axis) and abundance (y axis) of species in the reactant gas for an "unstruck" portion of the anvil, sampled at various times (z axis) during the test run. FIG. 21B shows the mass numbers (x axis) and abundance of species (y axis) in the product gas for the "struck" portion of the anvil, sampled at various times (z axis) during the test run. Comparing FIGS. 21A with 21B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

Test Example 10

Use of SAT Apparatus For Pd-catalyzed Synthesis of Hydrocarbons from Methane Gas from 30° C. to 92° C.

This test run was conducted as described in Test Example 6, except that the test run began with the SAT apparatus heated to 30° C., and the temperature was raised to 92° C. over the course of the test run.

Figure 22A:
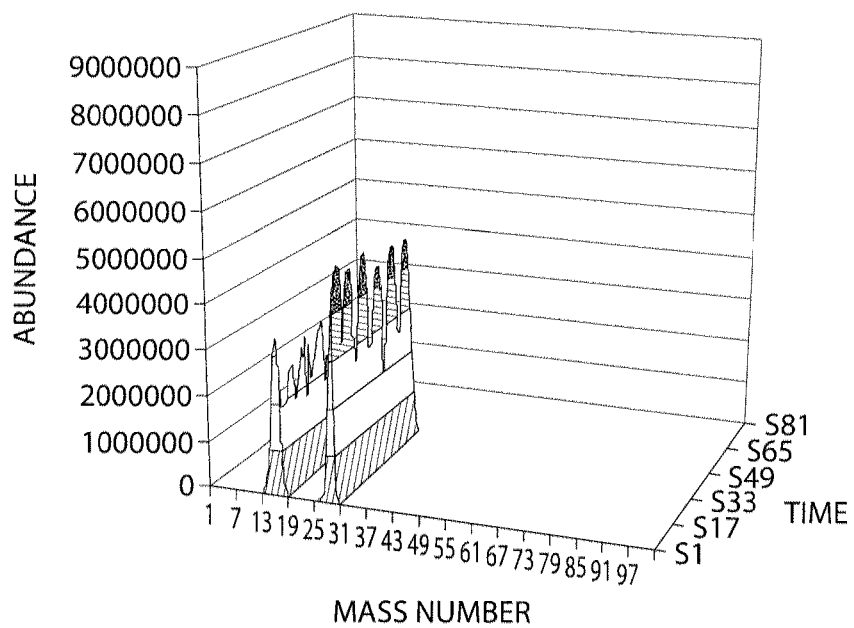
FIG. 22 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is raised from 30° C. to 92° C.
Figure 22B:
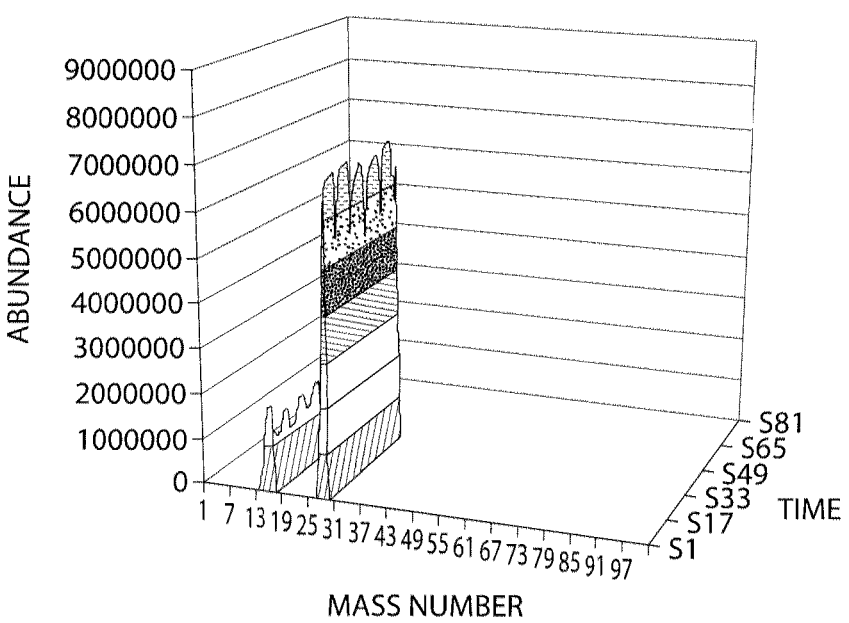

FIG. 22A shows the mass numbers (x axis) and abundance (y axis) of species in the reactant gas for an "unstruck" portion of the anvil, sampled at various times (z axis) during the test run. FIG. 22B shows the mass numbers (x axis) and abundance of species (y axis) in the product gas for the "struck" portion of the anvil, sampled at various times (z axis) during the test run. Comparing FIGS. 22A with 22B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

Test Example 11

Use of SAT Apparatus for Pd-catalyzed Synthesis of Hydrocarbons from Methane Gas from 100° C. to 200° C.

This test run was conducted as described in Test Example 6, except that the test run began with the SAT apparatus heated to 100° C., and the temperature was raised to 200° C. over the course of the test run.

Figure 23A:
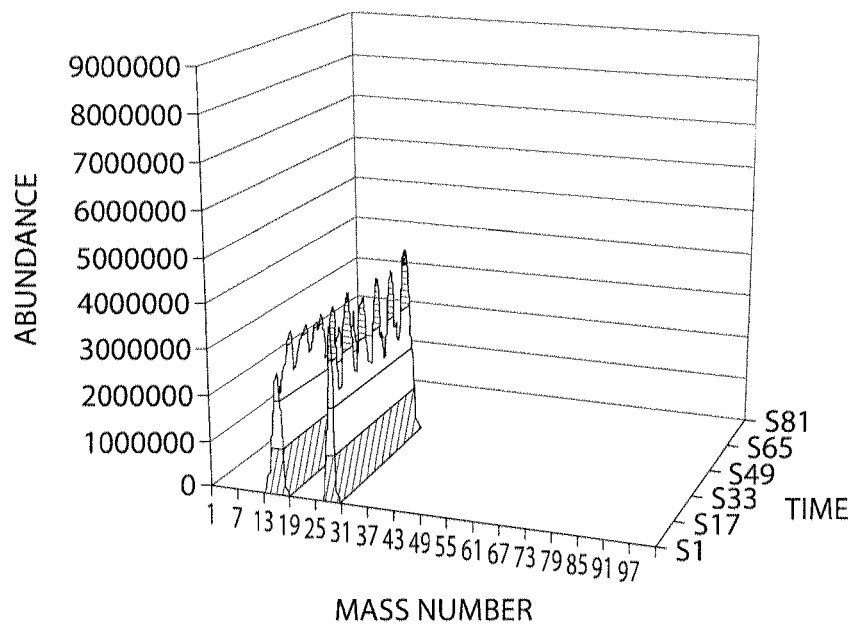
FIG. 23 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is raised from 100° C. to 200° C.
Figure 23B:
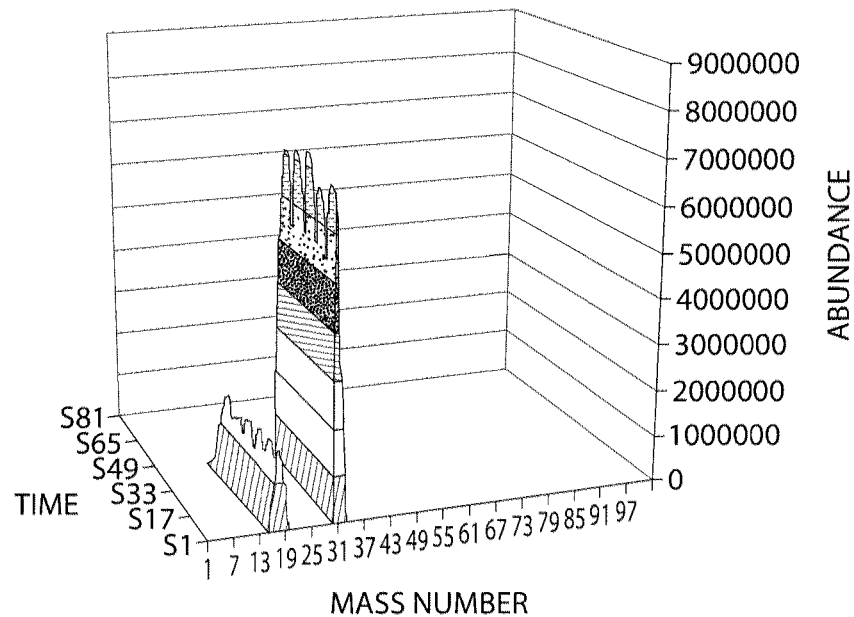

FIG. 23A shows the mass numbers (x axis) and abundance (y axis) of species in the reactant gas for an "unstruck" portion of the anvil, sampled at various times (z axis) during the test run. FIG. 23B shows the mass numbers (x axis) and abundance of species (y axis) in the product gas for the "struck" portion of the anvil, sampled at various times (z axis) during the test run. Comparing FIGS. 23A with 23B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

Test Example 12

Use of SAT Apparatus for Pd-catalyzed Synthesis of Hydrocarbons from Methane Gas from 85° C. to 40° C.

This test run was conducted as described in Test Example 6, except that the test run began with the SAT apparatus heated to 85° C., and the temperature was lowered to 40° C. over the course of the test run.

Figure 24A:
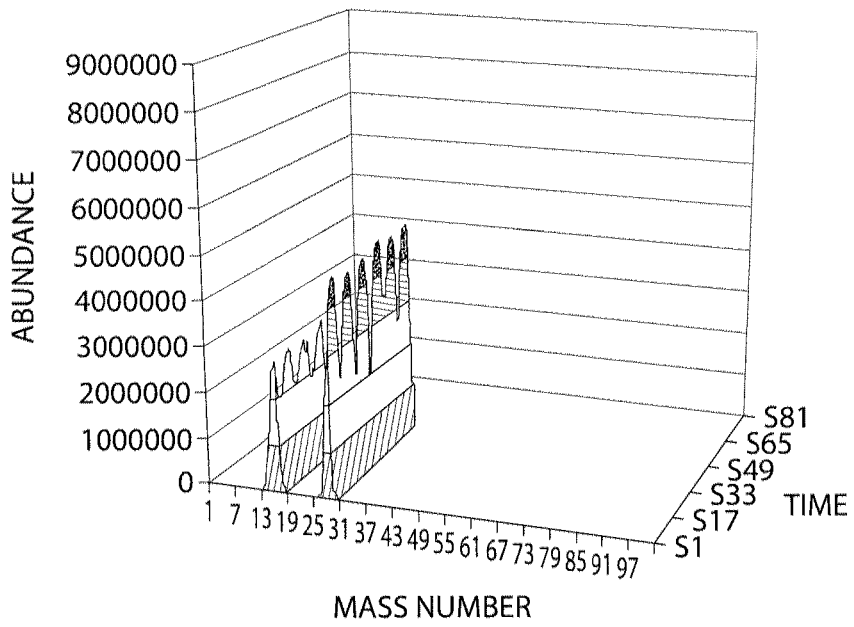
FIG. 24 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is lowered from 85° C. to 40° C.
Figure 24B:
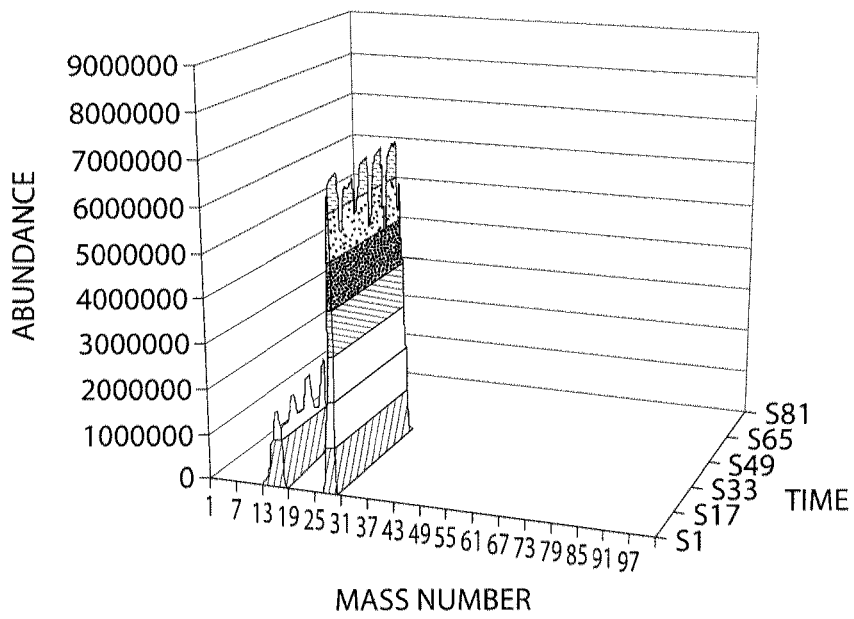

FIG. 24A shows the mass numbers (x axis) and abundance (y axis) of species in the reactant gas for an "unstruck" portion of the anvil, sampled at various times (z axis) during the test run. FIG. 24B shows the mass numbers (x axis) and abundance of species (y axis) in the product gas for the "struck" portion of the anvil, sampled at various times (z axis) during the test run. Comparing FIGS. 24A with 24B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

Test Example 13

Use of SAT Apparatus for Pd-catalyzed Synthesis of Hydrocarbons from Methane Gas from 24° C. to 130° C.

This test run was conducted as described in Test Example 6, except that the test run began with the SAT apparatus heated to 24° C., and the temperature was raised to 130° C. over the course of the test run.

Figure 25A:
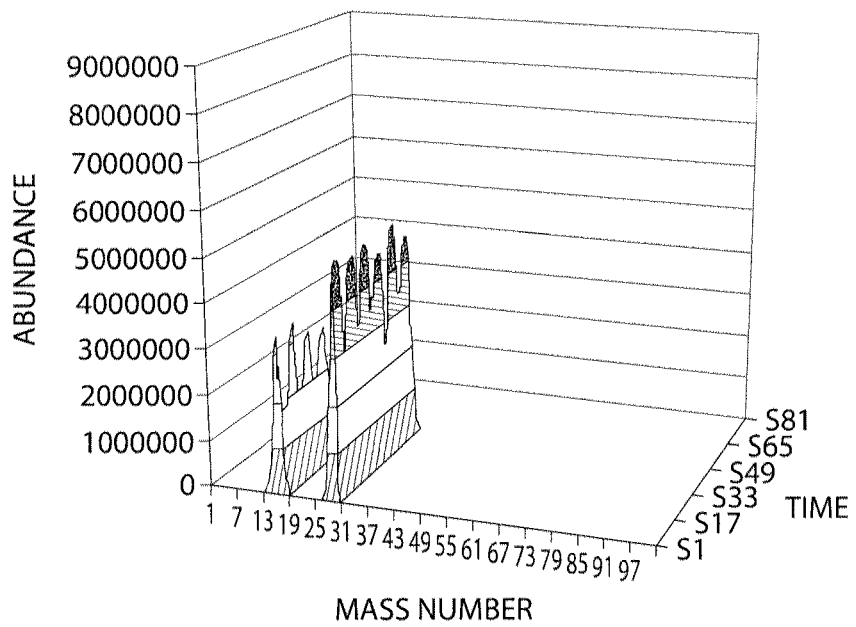
FIG. 25 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is raised from 24° C. to 130° C.
Figure 25B:
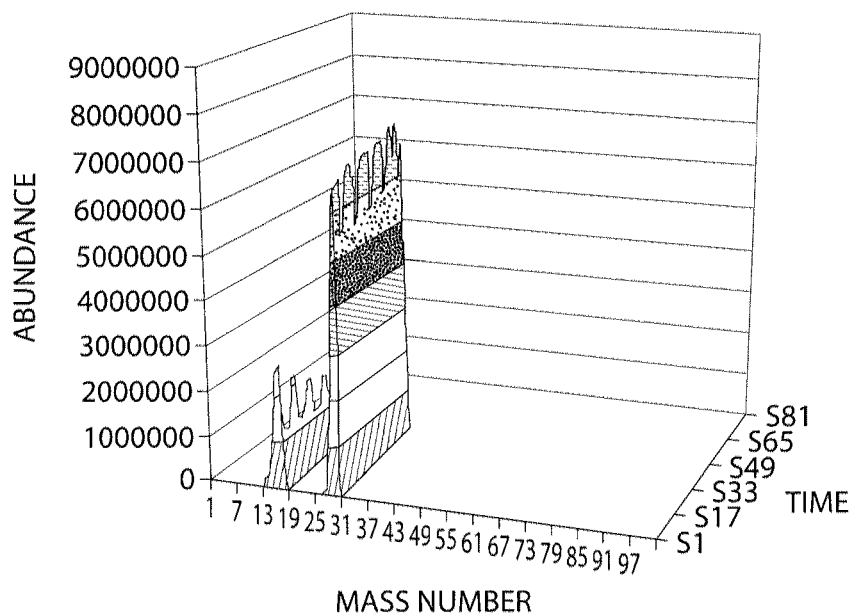

FIG. 25A shows the mass numbers (x axis) and abundance (y axis) of species in the reactant gas for an "unstruck" portion of the anvil, sampled at various times (z axis) during the test run. FIG. 25B shows the mass numbers (x axis) and abundance of species (y axis) in the product gas for the "struck" portion of the anvil, sampled at various times (z axis) during the test run. Comparing FIGS. 25A with 25B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

Test Example 14

Use of SAT Apparatus for Pd-catalyzed Synthesis of Hydrocarbons from Methane Gas from 100° C. to 65° C.

This test run was conducted as described in Test Example 6, except that the test run began with the SAT apparatus heated to 100° C., and the temperature was lowered to 65° C. over the course of the test run.

Figure 26A:
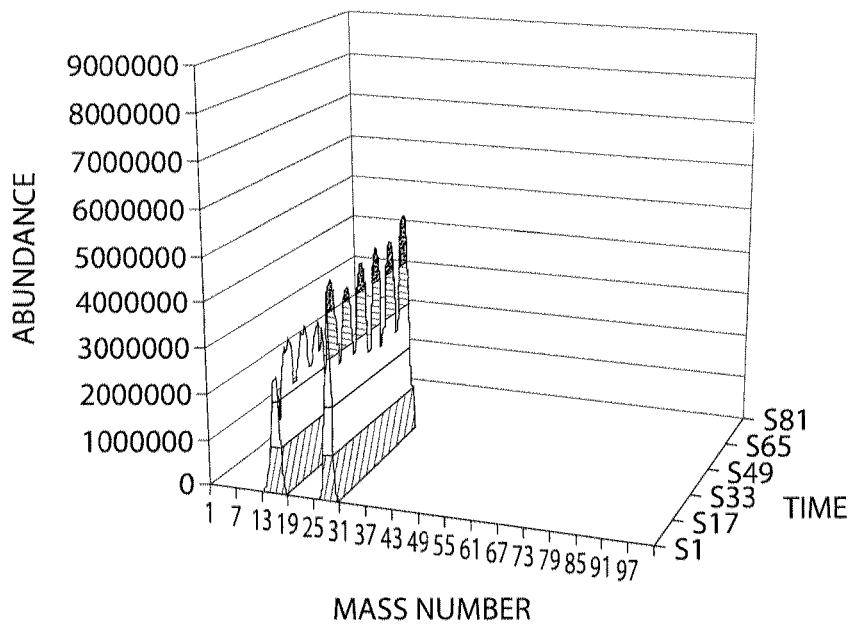
FIG. 26 is a graph showing the mass numbers and abundance of species in the product gas for (a) an "unstruck" portion of a Pd anvil and (b) a "struck" portion of a Pd anvil, sampled at various times during a test run of the anvil/striker catalytic reactor test apparatus of FIG. 13, wherein the temperature is lowered from 100° C. to 65° C.
Figure 26B:
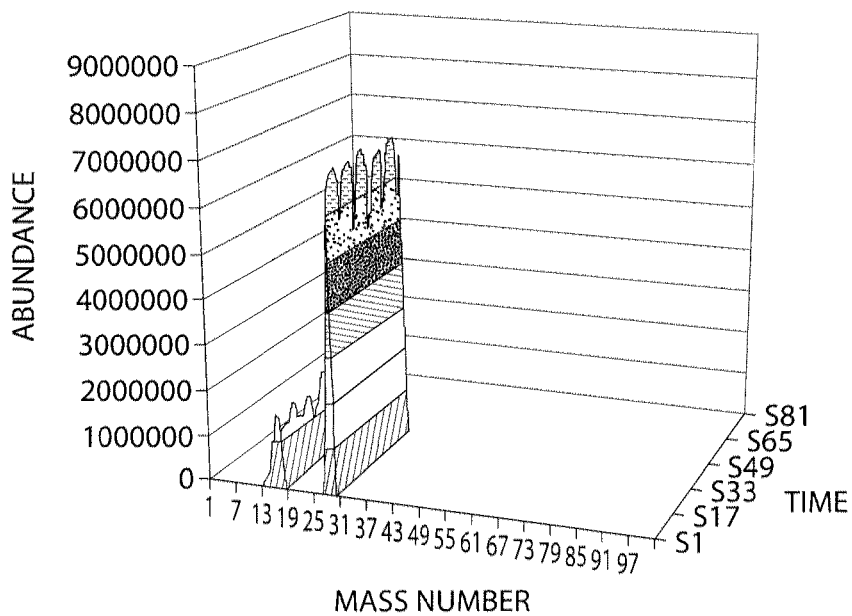

FIG. 26A shows the mass numbers (x axis) and abundance (y axis) of species in the reactant gas for an "unstruck" portion of the anvil, sampled at various times (z axis) during the test run. FIG. 26B shows the mass numbers (x axis) and abundance of species (y axis) in the product gas for the "struck" portion of the anvil, sampled at various times (z axis) during the test run. Comparing FIGS. 26A with 26B shows that the ratio of the product abundance to the methane starting material abundance for the "unstruck" portion of the anvil is substantially less than that for the "struck" portion of the anvil, indicating that the contact between the Pd anvil and Pd striker substantially enhanced the catalytic reactivity of Pd in the synthesis of higher hydrocarbons from methane over this temperature range.

While several embodiments of the invention have been described and illustrated herein, those of ordinary skill in the art will readily envision a variety of other means and structures for performing the functions and/or obtaining the results or advantages described herein, and each of such variations, modifications and improvements is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, provided that such features, systems, materials and/or methods are not mutually inconsistent, is included within the scope of the present invention.

In the claims (as well as in the specification above), all transitional phrases or phrases of inclusion, such as "comprising," "including," "carrying," "having," "containing," "composed of," "made of," "formed of," "involving" and the like shall be interpreted to be open-ended, i.e., to mean "including but not limited to" and, therefore, encompassing the items listed thereafter and equivalents thereof as well as additional items. Only the transitional phrases or phrases of inclusion "consisting of" and "consisting essentially of" are to be interpreted as closed or semi-closed phrases, respectively. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein in the specification and in the claims, the phrase "at least one," in reference to a list of one or more elements, should be understood, unless otherwise indicated, to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Any terms as used herein related to shape, orientation, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described.

All references cited herein, including patents and published applications, are incorporated herein by reference. In cases where the present specification and a document incorporated by reference and/or referred to herein include conflicting disclosure, and/or inconsistent use of terminology, and/or the incorporated/referenced documents use or define terms differently than they are used or defined in the present specification, the present specification shall control.

What is claimed is:

1. A catalytic reactor system comprising:
    at least two non-porous catalytic objects, each object having at least one surface complementary in shape and/or contour to at least one surface on another of the catalytic objects such that a projected contact area between two of the catalytic objects is capable of being greater than 1% of a catalytically active total external contact surface area of the two contacting catalytic objects,
    wherein the at least two non-porous catalytic objects comprise discrete particles or pellets, and wherein the discrete particles or pellets have a shape that is essentially a truncated icosahedron;
    a reactor comprising an inlet in fluid communication with a source of a reactant flowing into the reactor through the inlet, and an outlet through which a product of a reaction catalyzed by the at least two non-porous catalytic objects flows out of the reactor, wherein the at least two non-porous catalytic objects are contained within the reactor such that the at least two non-porous catalytic objects are exposed to the reactant; and
    a contact-inducing device comprising or contained in the reactor and acting on the at least two catalytic objects to repeatedly bring complementary surfaces of the at least two catalytic objects into contact with each other, such that a projected contact area between two of the contacting catalytic objects is on average greater than 1% of the catalytically active total external contact surface area of such two contacting catalytic objects.

2. The catalytic reactor system as in claim 1, wherein each of the two catalytic objects comprise at least one essentially planar surface such that an essentially planar surface of a first catalytic object is capable of contacting an essentially planar surface of a second catalytic object.

3. The catalytic reactor system as in claim 1, wherein the catalytic objects comprise a catalytically active material comprising a metal or metal alloy.

4. The catalytic reactor system as in claim 1, wherein the catalytic objects further comprise a support material coated with a catalytically active material.

5. The catalytic reactor system as in claim 4, wherein the support material is a ceramic.

6. The catalytic reactor system as in claim 4, wherein the at least two catalytic objects are each characterized by a particle size in the range of 0.1 mm-25 mm.

7. The catalytic reactor system as in claim 6, wherein the at least two catalytic objects are each characterized by a particle size in the range of 1 mm-10 mm.

8. The catalytic reactor system as in claim 1, wherein the catalyst reactor system comprises a slurry bubble column reactor and the contact-inducing device comprises a device configured to generate fluid flow capable of suspending and/or agitating the discrete particles or pellets.

9. The catalytic reactor system as in claim 1, wherein the catalyst reactor system comprises a continuously stirred tank reactor and wherein the contact-inducing device comprises a stirring device.

10. The catalytic reactor system as in claim 1, wherein the at least two catalytic objects are each characterized by a particle size in the range of 0.1 mm-25 mm.

11. The catalytic reactor system as in claim 10, wherein the at least two catalytic objects are each characterized by a particle size in the range of 1 mm-10 mm.

12. The catalytic reactor system as in claim 1, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 2% of the catalytically active total external contact surface area of such two contacting catalytic objects.

13. The catalytic reactor system as in claim 12, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 3% of the catalytically active total external contact surface area of such two contacting catalytic objects.

14. The catalytic reactor system as in claim 13, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 4% of the catalytically active total external contact surface area of such two contacting catalytic objects.

15. The catalytic reactor system as in claim 14, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 5% of the catalytically active total external contact surface area of such two contacting catalytic objects.

16. The catalytic reactor system as in claim 15, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 6% of the catalytically active total external contact surface area of such two contacting catalytic objects.

17. The catalytic reactor system as in claim 16, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 7% of the catalytically active total external contact surface area of such two contacting catalytic objects.

18. The catalytic reactor system as in claim 17, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 8% of the catalytically active total external contact surface area of such two contacting catalytic objects.

19. The catalytic reactor system as in claim 18, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 9% of the catalytically active total external contact surface area of such two contacting catalytic objects.

20. The catalytic reactor system as in claim 19, wherein the at least two non-porous catalytic objects are shaped and the contact inducing device is configured and operated to bring the complementary surfaces of the at least two catalytic objects into contact with each other such that a projected contact area between two of the contacting catalytic objects is on average greater than 10% of the catalytically active total external contact surface area of such two contacting catalytic objects.

21. A catalytic reactor system comprising:
at least two non-porous catalytic objects, each object having at least one surface complementary in shape and/or contour to at least one surface on another of the catalytic objects such that a projected contact area between two of the catalytic objects is capable of being greater than 1% of a catalytically active total external contact surface area of the two contacting catalytic objects;
a reactor comprising an inlet in fluid communication with a source of a reactant flowing into the reactor through the inlet, and an outlet through which a product of a reaction catalyzed by the at least two non-porous catalytic objects flows out of the reactor, wherein the at least two non-porous catalytic objects are contained within the reactor such that the at least two non-porous catalytic objects are exposed to the reactant; and
contact-inducing device comprising or contained in the reactor and acting on the at least two catalytic objects to repeatedly bring complementary surfaces of the at least two catalytic objects into contact with each other, such that a projected contact area between two of the contacting catalytic objects is on average greater than 1% of the catalytically active total external contact surface area of such two contacting catalytic objects,
wherein the complementary surface of a first catalytic object of the at least two non-porous catalytic objects has a surface area that is larger than the surface area of the complementary surface of a second catalytic object of the at least two non-porous catalytic objects, such that, when the first catalytic object is in contact with the second catalytic object, the complementary surface of the first catalytic object comprises a first portion of surface area that is in contact with the complementary surface of the second catalytic object and at least a second portion of surface area that is not in contact with the complementary surface of the second catalytic object, and
wherein the first portion of surface area of the complementary surface of the first catalytic object that is in contact with the complementary surface of the second catalytic object can be isolated from the at least a second portion of surface area that is not in contact with the complementary surface of the second catalytic object such that reactants and/or products in contact with the first portion of surface area can be sampled independently from reactants and/or products in contact with the at least a second portion of surface area.

22. The catalytic reactor system as in claim 21, wherein the contact-inducing device comprises a mechanical apparatus comprising or to which is attached at least one of the catalytic objects.

23. The catalytic reactor system as in claim 21, wherein at least one of the catalytic objects has a shape that is essentially a cylinder.

24. The catalytic reactor system as in claim 23, where a cross-section of the cylinder perpendicular to its longitudinal axis has a perimeter that is essentially polygonal.

25. The catalytic reactor system as in claim 21, wherein at least one of the catalytic objects is configured as a gear having a plurality of gear teeth comprising a catalytic material.

* * * * *